United States Patent
Banga et al.

(10) Patent No.: US 10,663,266 B2
(45) Date of Patent: May 26, 2020

(54) INTERDICTION SYSTEM AND METHOD OF OPERATION

(71) Applicant: Airspace Systems Inc., San Leandro, CA (US)

(72) Inventors: Jasminder S. Banga, San Francisco, CA (US); Earl R. Stirling, Berkeley, CA (US); Noah U. Moore, San Francisco, CA (US)

(73) Assignee: Airspace Systems, Inc., San Leandro, CA (US)

( * ) Notice: Subject to any disclaimer, the term of this patent is extended or adjusted under 35 U.S.C. 154(b) by 0 days.

(21) Appl. No.: 15/250,794

(22) Filed: Aug. 29, 2016

(65) Prior Publication Data

US 2018/0245888 A1     Aug. 30, 2018

Related U.S. Application Data

(60) Provisional application No. 62/210,728, filed on Aug. 27, 2015.

(51) Int. Cl.
| | |
|---|---|
| *F41H 11/02* | (2006.01) |
| *B64C 39/02* | (2006.01) |
| *F42B 15/10* | (2006.01) |
| *F41H 11/04* | (2006.01) |
| *F42B 10/56* | (2006.01) |

(52) U.S. Cl.
CPC ............ *F41H 11/02* (2013.01); *B64C 39/024* (2013.01); *F41H 11/04* (2013.01); *F42B 10/56* (2013.01); *F42B 15/10* (2013.01); *B64C 2201/182* (2013.01)

(58) Field of Classification Search
CPC .......... F41H 11/02; F41H 11/04; F42B 10/56; F42B 15/10; B64C 39/024; B64C 2201/182
USPC .......................................................... 89/1.11
See application file for complete search history.

(56) References Cited

U.S. PATENT DOCUMENTS

| | | | | | |
|---|---|---|---|---|---|
| 4,231,311 | A | * | 11/1980 | Longerich ................ | B63G 8/42 102/403 |
| 4,656,945 | A | * | 4/1987 | Stancil .................... | F42B 12/66 102/405 |
| 4,679,504 | A | * | 7/1987 | Carpenter ............... | F41H 11/02 102/348 |
| 4,768,417 | A | * | 9/1988 | Wright .................... | B63G 9/04 102/406 |

(Continued)

*Primary Examiner* — Michelle Clement
(74) *Attorney, Agent, or Firm* — Van Pelt, Yi & James LLP

(57) ABSTRACT

A system for arresting and capturing airborne targets comprising: a projectile comprising an airframe which houses a means for entanglement, a means for propulsion, and a means for producing drag, wherein the means for entanglement is tethered to the airframe, a launcher capable of launching the projectile to within a close distance of an airborne target, wherein as the projectile approaches the airborne target the projectile is first slowed down by the means for producing drag, and second, as the projectile slows down the means for propulsion causes the means for entanglement to be projected towards the airborne target, wherein the means for entanglement arrests and captures the airborne target, thus tethering it to the projectile, and wherein the means for producing drag slows down the speed at which the projectile and tethered airborne target descend to the ground.

14 Claims, 18 Drawing Sheets

(56) References Cited

U.S. PATENT DOCUMENTS

| | | | | |
|---|---|---|---|---|
| 4,966,079 A * | 10/1990 | Humphrey | F42B 22/10 | 102/411 |
| 5,012,717 A * | 5/1991 | Metersky | F41G 7/008 | 89/1.11 |
| 5,022,470 A * | 6/1991 | Andersen | E21B 7/008 | 175/14 |
| 5,069,109 A * | 12/1991 | Lavan, Jr. | B63G 9/04 | 114/240 C |
| 5,341,718 A * | 8/1994 | Woodall, Jr. | B63G 9/02 | 102/377 |
| 5,417,139 A * | 5/1995 | Boggs | F41H 11/14 | 102/504 |
| 5,537,909 A * | 7/1996 | Schneider | F42B 12/365 | 89/1.11 |
| 5,583,311 A * | 12/1996 | Rieger | F41H 11/04 | 102/405 |
| 5,750,918 A * | 5/1998 | Mangolds | F41H 13/0006 | 102/213 |
| 5,814,754 A * | 9/1998 | Mangolds | B63G 9/02 | 342/10 |
| 5,898,125 A * | 4/1999 | Mangolds | F41H 13/0006 | 102/293 |
| 6,182,553 B1 * | 2/2001 | Peterson | B63G 7/02 | 102/403 |
| 6,626,077 B1 * | 9/2003 | Gilbert | F41H 13/0006 | 102/400 |
| 6,904,838 B1 * | 6/2005 | Dindl | B64D 45/0015 | 102/400 |
| 6,957,602 B1 * | 10/2005 | Koenig | B64D 7/00 | 102/502 |
| 7,104,496 B2 * | 9/2006 | Chang | F41H 5/007 | 102/400 |
| 7,190,304 B1 * | 3/2007 | Carlson | F41G 5/08 | 244/3.1 |
| 7,328,644 B2 * | 2/2008 | Vickroy | F41H 11/02 | 102/405 |
| 7,786,417 B2 * | 8/2010 | Sells, II | F41H 11/02 | 102/400 |
| 7,878,103 B2 * | 2/2011 | Imholt | F41B 9/0087 | 89/1.11 |
| 7,882,775 B2 * | 2/2011 | Martinez | B63G 9/04 | 102/504 |
| 7,900,548 B2 * | 3/2011 | Hoadley | F41H 5/007 | 102/502 |
| 7,910,867 B1 * | 3/2011 | Edwards | F41G 7/007 | 235/400 |
| 7,964,830 B2 * | 6/2011 | Olden | F42B 10/50 | 244/1 R |
| 7,987,791 B2 * | 8/2011 | Schneider | F42B 12/68 | 102/351 |
| 8,082,835 B2 * | 12/2011 | Soukos | F41H 5/007 | 89/1.11 |
| 8,100,359 B2 * | 1/2012 | Al-Qaffas | F41F 1/06 | 244/1 TD |
| 8,173,946 B1 * | 5/2012 | Patterson | F41F 3/073 | 244/3.1 |
| 8,205,537 B1 * | 6/2012 | Dupont | F41H 13/0006 | 102/504 |
| 8,375,837 B2 * | 2/2013 | Goossen | F41H 13/0006 | 244/110 F |
| 8,387,540 B2 * | 3/2013 | Merems | F41H 11/02 | 102/501 |
| 8,399,816 B2 * | 3/2013 | Glasson | F41H 13/0006 | 244/1 R |
| 8,434,711 B2 * | 5/2013 | Berman | F41H 11/04 | 244/110 C |
| 8,552,282 B1 * | 10/2013 | Garcia | F42B 19/06 | 114/21.2 |
| 8,575,526 B1 * | 11/2013 | Colvin | F41G 7/308 | 244/3.1 |
| 8,596,178 B2 * | 12/2013 | Rogers | F41H 13/0006 | 102/502 |
| 8,601,928 B2 * | 12/2013 | Martinez | B63G 9/04 | 114/317 |
| 9,022,323 B2 * | 5/2015 | Starke | B64G 1/1078 | 244/158.2 |
| 9,074,858 B2 * | 7/2015 | Yee | F41H 11/02 | |
| 9,085,362 B1 * | 7/2015 | Kilian | B64F 1/02 | |
| 9,187,191 B1 * | 11/2015 | Jensen | B64G 1/646 | |
| 2005/0016372 A1 * | 1/2005 | Kilvert | F41H 13/0006 | 89/1.34 |
| 2006/0112817 A1 * | 6/2006 | Lloyd | F41H 13/0006 | 89/1.11 |
| 2006/0169832 A1 * | 8/2006 | Glasson | F41H 11/04 | 244/3.1 |
| 2006/0254108 A1 * | 11/2006 | Park | F41H 13/0025 | 42/1.08 |
| 2007/0169616 A1 * | 7/2007 | Vickroy | F41H 11/02 | 89/1.11 |
| 2007/0261542 A1 * | 11/2007 | Chang | F41H 11/02 | 89/1.11 |
| 2009/0114761 A1 * | 5/2009 | Sells, II | F41H 11/02 | 244/3.1 |
| 2010/0269675 A1 * | 10/2010 | Larkin | B63G 8/001 | 89/1.11 |
| 2010/0313741 A1 * | 12/2010 | Smogitel | F42B 12/205 | 89/1.11 |
| 2012/0011996 A1 * | 1/2012 | Glasson | F41H 11/04 | 89/36.17 |
| 2012/0043411 A1 * | 2/2012 | Beck | B64C 39/024 | 244/3.24 |
| 2014/0033907 A1 * | 2/2014 | Martinez | F41H 13/0006 | 89/1.11 |
| 2015/0143982 A1 * | 5/2015 | Rovinsky | F41H 11/02 | 89/1.11 |
| 2015/0241180 A1 * | 8/2015 | Pruett | F41H 11/02 | 89/1.11 |

* cited by examiner

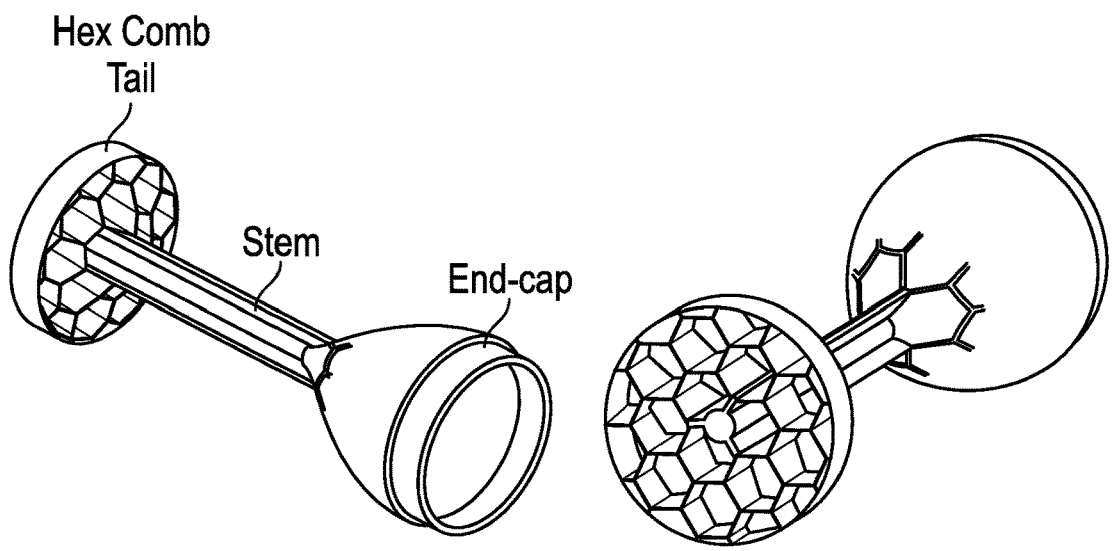
FIG. 36A  FIG. 36B
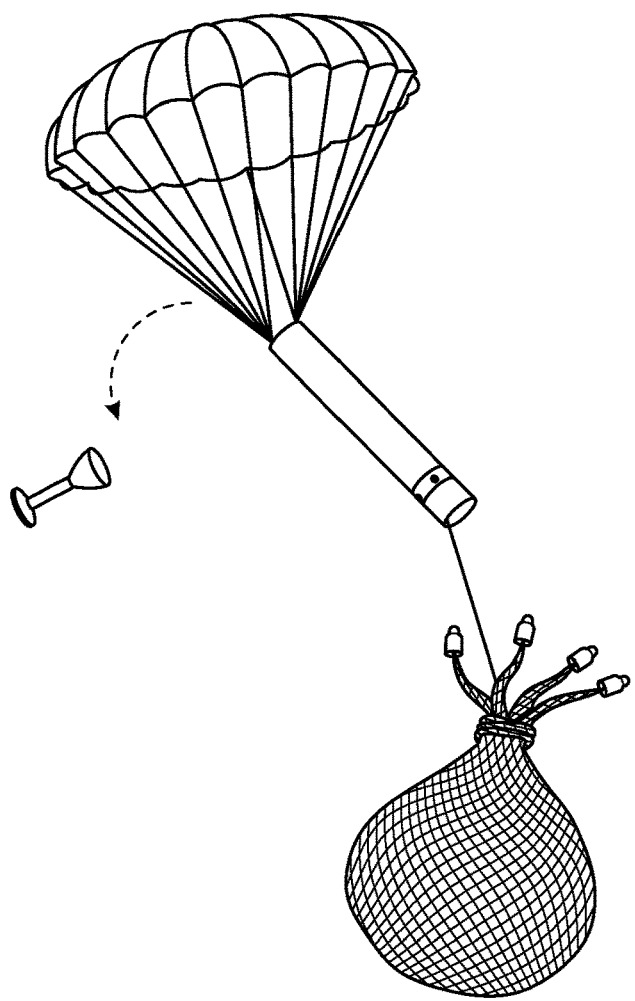
FIG. 37

INTERDICTION SYSTEM AND METHOD OF OPERATION

TECHNICAL FIELD

This invention relates generally to the aeronautics field, and more specifically to a new and useful defense system in the aeronautics field.

BACKGROUND

With the increased commercial popularity of unmanned aerial vehicles (UAVs), commonly known as drones, there has been an increased need for defense mechanisms that remove unwanted UAVs from restricted airspace.

Thus, there is a need in the aeronautics field to create a new and useful UAV interdiction module. This invention provides such new and useful UAV interdiction module.

BRIEF DESCRIPTION OF THE FIGURES

FIGS. 36A and 36B are perspective views of a tail with a hex comb tail feature.

FIG. 37 is a schematic representation of drag mechanism operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
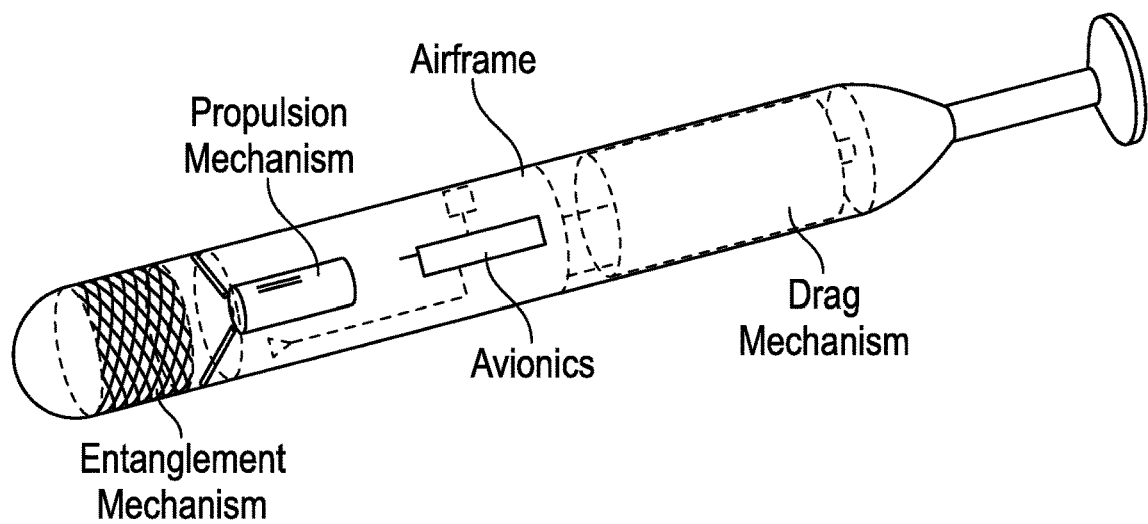
FIG. 1 is a schematic representation of a variation of the interdiction module.
Figure 2:
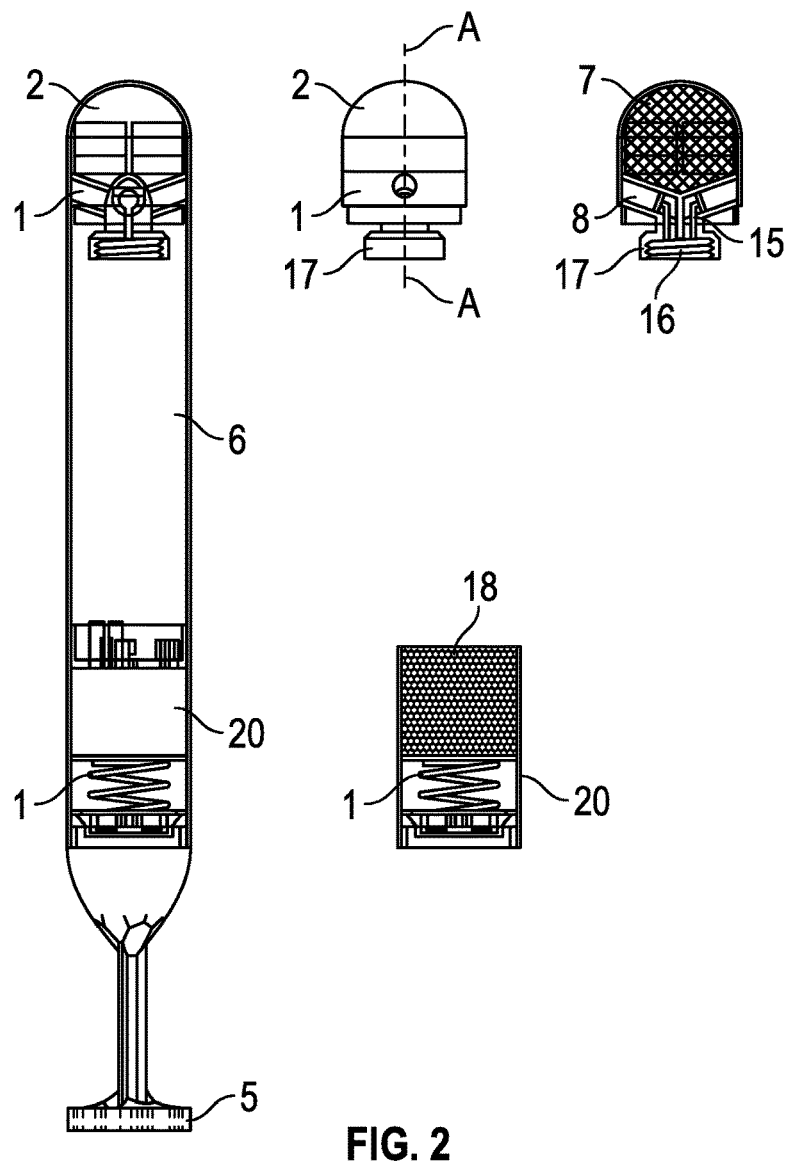
FIG. 2 is a schematic representation of a second variation of the interdiction module.
Figure 3:
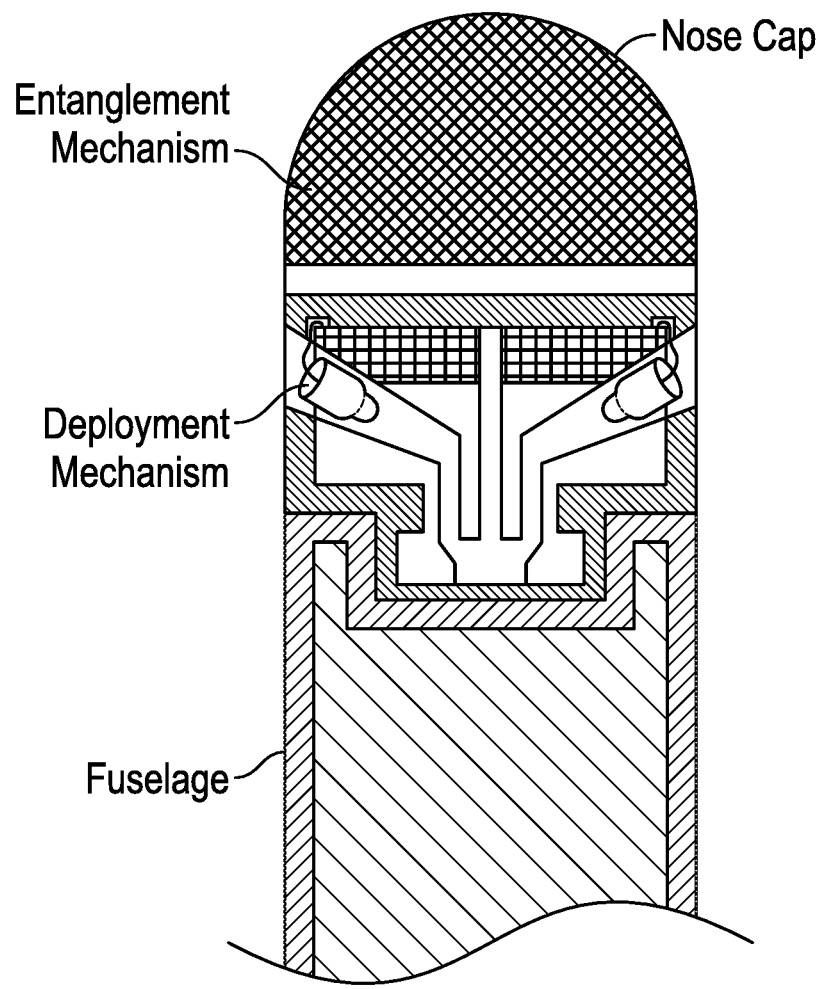
FIG. 3 is a schematic representation of a variation of the first end of the interdiction module.

As shown in FIG. 1, the interdiction module includes a propulsion mechanism, an entanglement mechanism, avionics, and an airframe. The interdiction module can additionally or alternatively include a drag mechanism and a steering mechanism. The interdiction module functions to interdict (e.g., intercept, prevent further movement of) an aerial system, such as a UAV.

Figure 4:
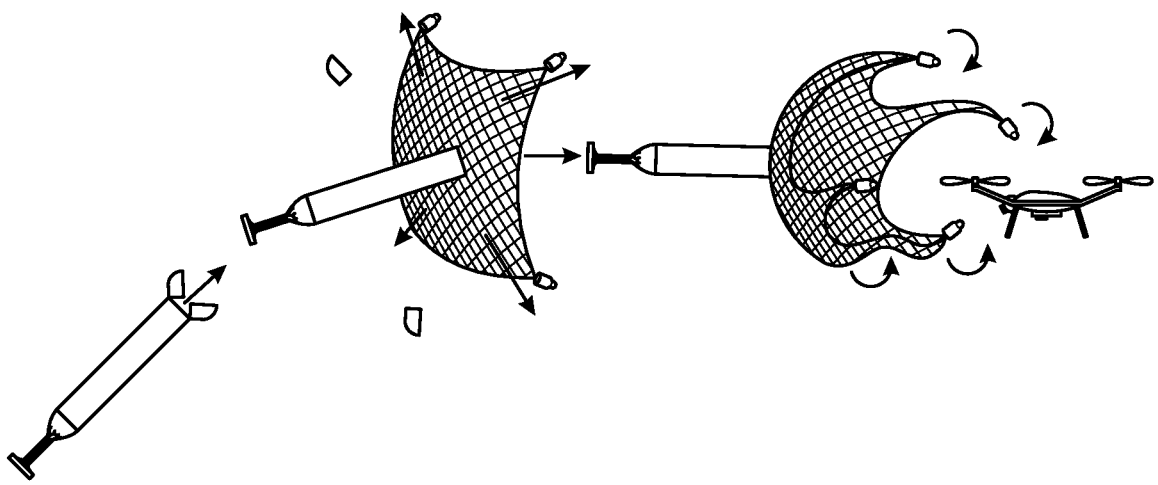
FIGS. 4 and 5 are examples of interdiction module operation.
Figure 5:
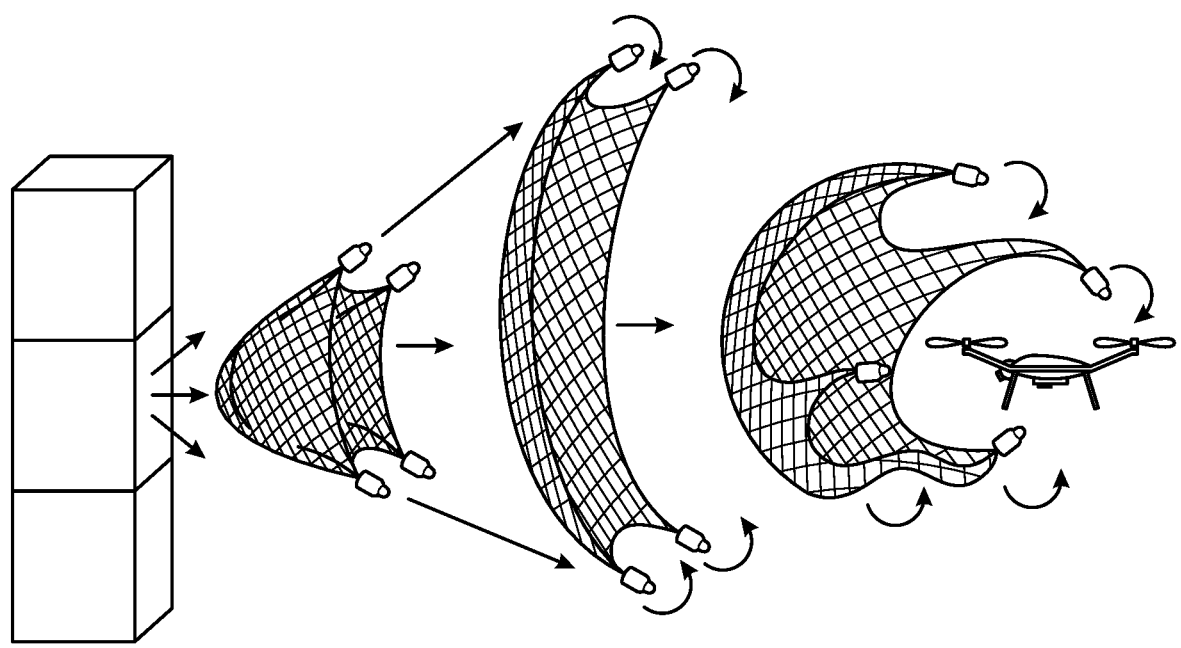
Figure 6:
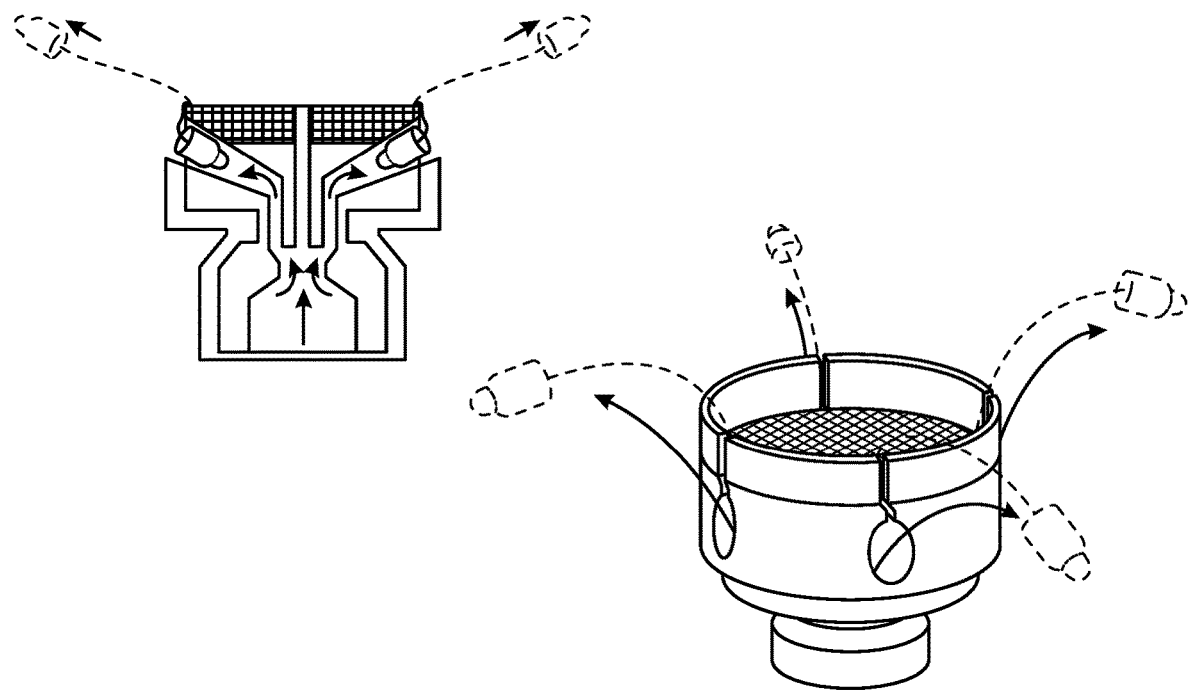
FIGS. 6, 7A, 7B, 8, and 9 are a first, second, third, and fourth example of deployment mechanism propulsion from the interdiction module, respectively.
Figure 7A:
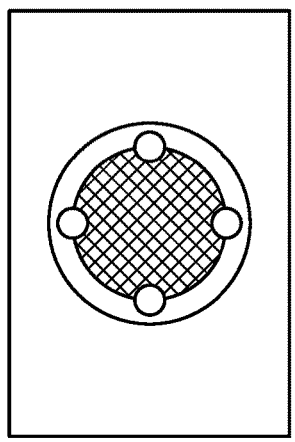
Figure 7B:
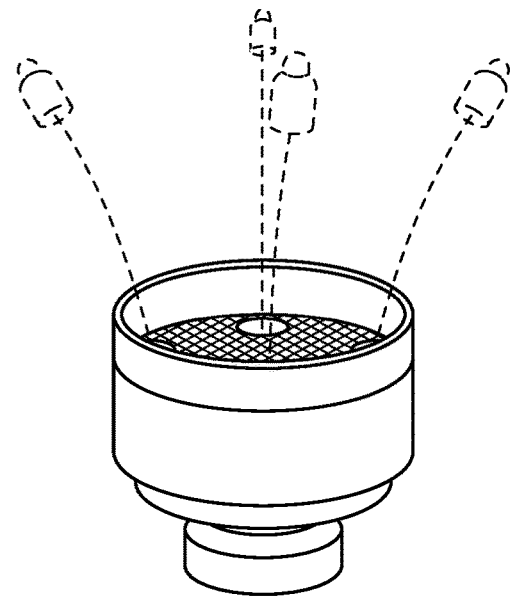
Figure 8:
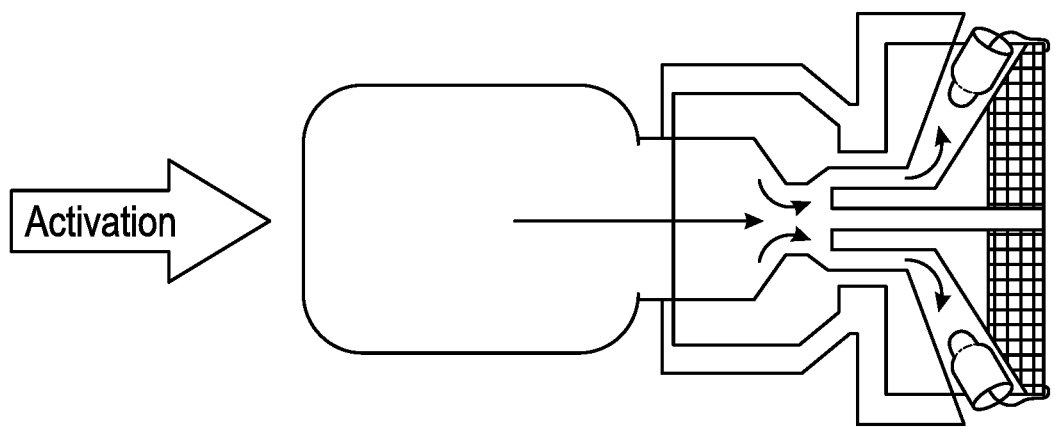
Figure 9:
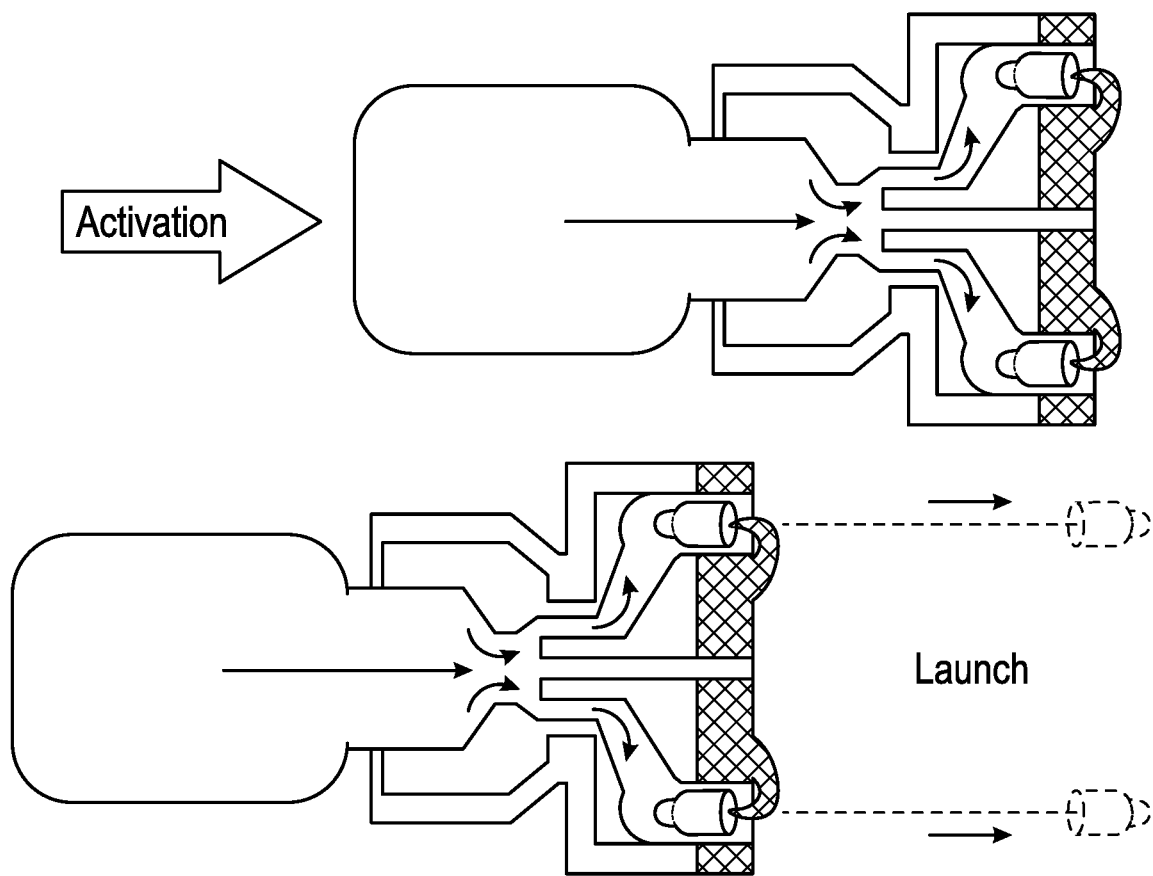
Figure 10:
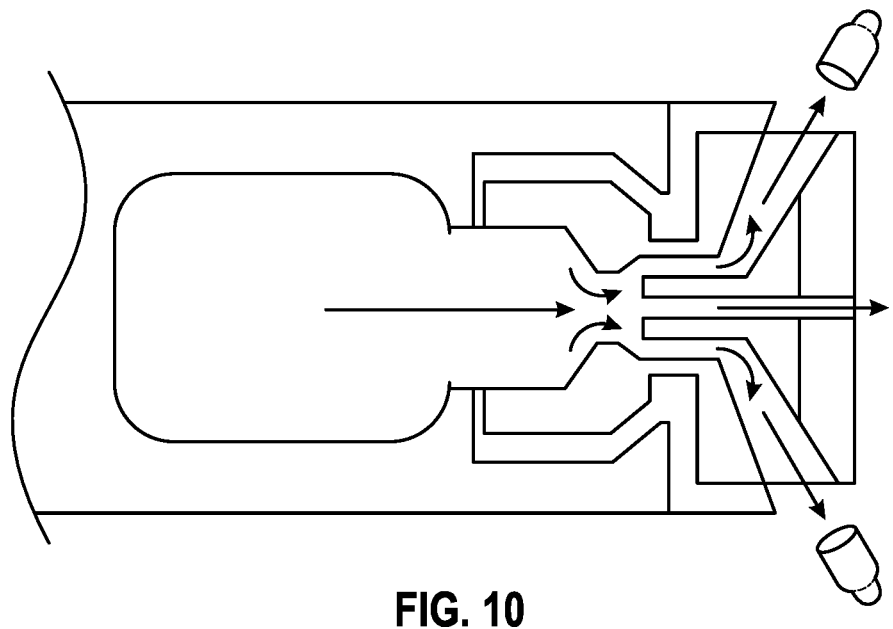
FIGS. 10 and 11 are schematic representations of a first and second propulsion mechanism variant, respectively.
Figure 11:
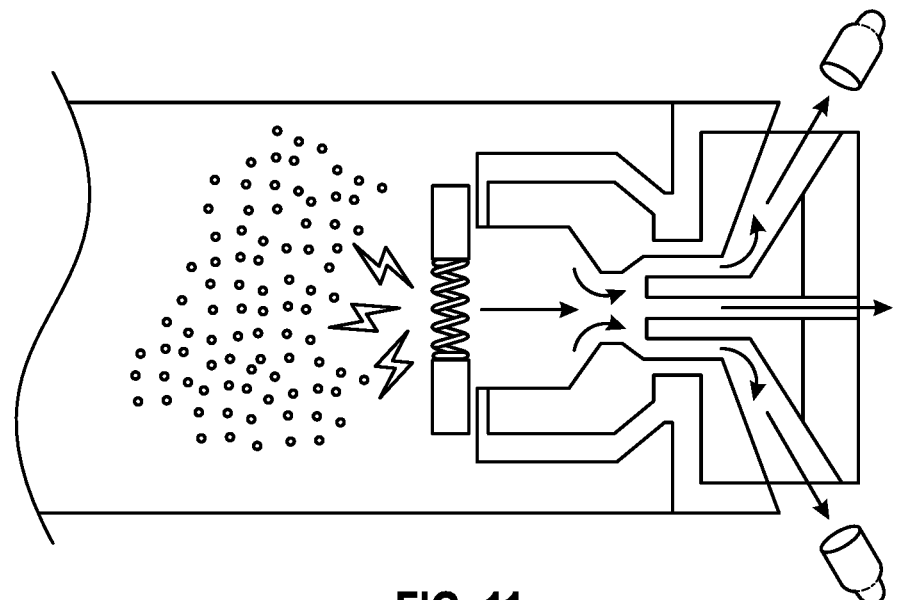
Figure 12:
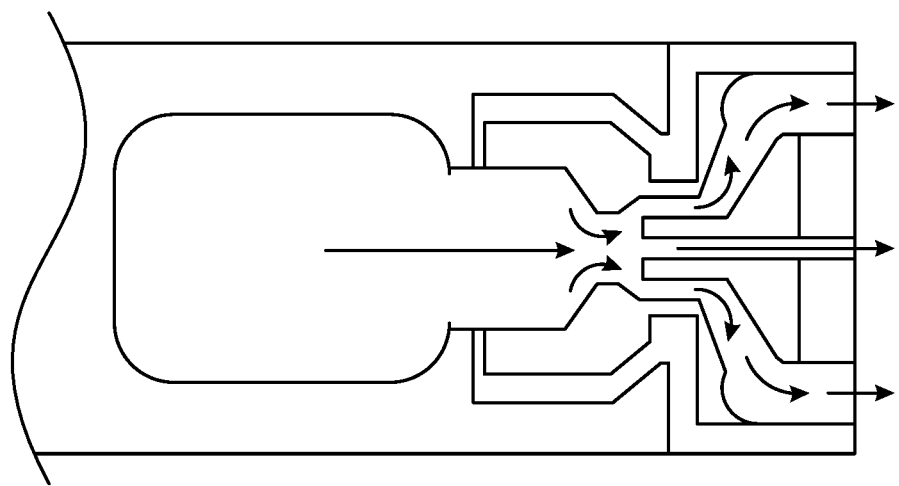
FIGS. 12 and 13 are schematic representations of a first and second propulsion mechanism variant, respectively.
Figure 13:
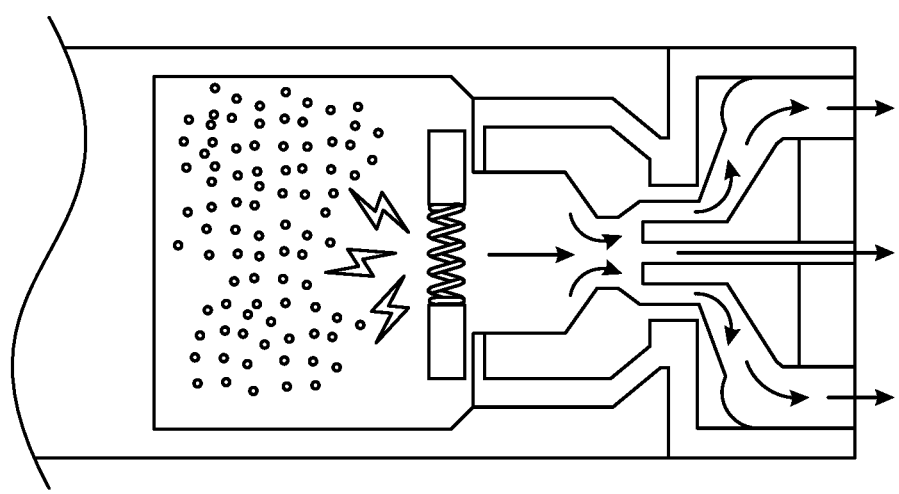

In one example of interdiction module operation, the interdiction module is fired toward the aerial system (e.g., from a ground-based system, a hand-held system, an aerial system, etc.), specific examples shown in FIGS. 4 and 5. The entanglement mechanism is deployed during module flight, and entangles the motive mechanism of the aerial system, thereby disabling or hindering aerial system operation. The interdiction module and/or entanglement mechanism can additionally be automatically or manually steered (e.g., with a remote control), which can increase aerial system entrainment accuracy. The drag mechanism can additionally be deployed after entanglement mechanism deployment and/or aerial system entrainment, such that the entrainment mechanism and any mechanism entrained therein can be steered toward a containment location. However, the interdiction module can be used in any other suitable manner.

2. Benefits

This interdiction module can confer several benefits. First, because the interdiction module is small and compact, the same interdiction module can be launched from multiple launching mechanisms. For example, the same interdiction module can be launched from a handheld launching mechanism, ground-based launching mechanism, aerial launching mechanism (e.g., launching mechanism mounted to a sentinel UAV, blimp, etc.), or any other suitable launching mechanism. Furthermore, the small form factor enables one or more interdiction modules to be adjacently fired from the same launching mechanism.

Second, the interdiction mechanism reduces the need for accurate aerial system interception. In particular, the deployed entanglement mechanism (e.g., a net) concurrently covers and entangles aerial systems within a wide physical area.

Third, the interdiction mechanism can increase the interception accuracy and/or containment control by including an on-board steering mechanism. In operation, the steering mechanism steer the interdiction module toward the aerial system during flight (e.g., after launch), and/or steer the interdiction module toward a containment location after entanglement mechanism deployment or aerial system entrainment. In some variations, the interdiction mechanism can additionally increase the interdiction module flight range by including an on-board thrust generator (e.g., a jet engine, propeller, etc.).

Fifth, the interdiction module can minimize the module form factor and part count by using the same propulsion mechanism to disengage the nose cone and launch the entanglement mechanism. However, the interdiction module can confer any other suitable set of benefits.

3. System 3.1 Propulsion Mechanism

As shown in FIGS. 6-13, the propulsion mechanism of the interdiction module functions to generate a propulsion force. The propulsion force can be used to launch the entanglement mechanism from the interdiction module, to actuate the frame (e.g., to disengage the nose cone), or used for any other suitable purpose. The propulsion mechanism preferably supplies (e.g., generates, releases) between 150-280 psi of pressure, but can alternatively generate any other suitable amount of propulsion force.

In a first variation, the propulsion mechanism includes a pressurized fluid, wherein the propulsion force is generated by pressurized fluid expansion. The fluid can be a gas (e.g., nitrogen, carbon dioxide, hydrogen, etc.), liquid, foam, or be any other suitable fluid. The fluid is preferably inert, but can alternatively be reactive (e.g., wherein subsequent fluid reaction generates the propulsion force). The fluid can be pre-generated (e.g., generated prior to interdiction module launch, prior to entanglement mechanism deployment, etc.), generated at time of use (e.g., generated immediately before or within a predetermined time period before entanglement mechanism deployment, etc.), or be generated at any other suitable time.

In a first embodiment, the propulsion mechanism includes a pressurized gas cartridge. In this embodiment, the propulsion mechanism generates the propulsion force when the cartridge is punctured. In a specific embodiment, the airframe can define a propulsion mechanism retention chamber fluidly coupled to an intermediary expansion chamber, wherein the expansion chamber is fluidly connected to the force transfer mechanisms (e.g., fluid manifolds). The fluid connections can be direct or controlled by one or more intervening valves. In a second specific embodiment, the airframe can be directly fluidly connected to the force transfer mechanism(s).

In a second embodiment, the propulsion mechanism includes a pressurized fluid generator. The pressurized fluid generator can include a solid or liquid reagent that reacts with one or more secondary reagents to form the pressurized fluid. The reaction can include: combustion, hydrolysis, electromagnetic excitation, mechanical perturbation, oxidization, or any other suitable reaction. The secondary reagent can include: heat, electricity, chemical compound, mechanical force, or any other suitable reagent. In a first example of the second embodiment, the propulsion mechanism includes a gas generator that includes an initiator and a propellant. The initiator can include a pyrotechnic device (e.g., electric match, electric conductor, etc.), an unstable chemical compound, or any other suitable component. The propellant is preferably a combustible solid, but can alternatively be a combustible liquid or gas. Examples of the propellant include: gunpowder, sodium azide ($NaN_3$); nitroguanidine, phase-stabilized ammonium nitrate ($NH_4NO_3$) or other nonmetallic oxidizer, and a nitrogen-rich fuel different from azide (e.g., tetrazoles, triazoles, and their salts); nitrocellulose based propellants; high-oxygen nitrogen-free organic compounds with inorganic oxidizers (e.g., di or tricarboxylic acids with chlorates ($ClO_3$—) or perchlorates ($ClO_4$—); metallic oxides; metal hydroxides; (Sr($NH_2NHCONHNH_2$).($NO_3$)$_2$ mixed with an oxidizing agent; guanidine nitrate 5-aminotetrazole, bitetrazole dehydrate, nitroimidazole, and basic copper nitrate; or any other suitable chemical compound. Specific examples of the gas generator include micro gas generators, engines, fuel cells, or any other suitable conversion systems. However, the propulsion mechanism can include any other suitable pressurized fluid generator. The propulsion mechanism can additionally include an air gap (e.g., defined by a key or other intervening component) between the initiator and propellant.

In a second variation, the propulsion mechanism includes a mechanical force generator. Examples of the mechanical force generator can include a piston mechanically connected to the force endpoint (e.g., driven by combustion, an electric motor, or any other suitable mechanism), springs, or any other suitable mechanical force generator.

In a third variation, the propulsion mechanism includes an electromagnetic force generator, wherein the electromagnetic force generator generates an electromagnetic force that repels the force endpoints (e.g., nose cone or deployment mechanism). Examples of the electromagnetic force generator include: a permanent magnet (e.g., wherein the force endpoints can be retained by a cap or other component that is removed to deploy the force endpoint), electromagnet, or any other suitable mechanism capable of generating an electromagnetic force. However, the interdiction module can include any other suitable propulsion mechanism.

The propulsion mechanism is preferably enclosed within the airframe (e.g., retained within the airframe lumen), but can alternatively be arranged external the airframe or located in any other suitable position. The propulsion mechanism can be removably mounted to the airframe, permanently mounted to the airframe, or otherwise coupled to the airframe. The mounting mechanism that mounts the propulsion mechanism to the airframe can be substantially rigid (e.g., adhesive, screws, etc.), dynamic (e.g., include springs, dampers, etc.), or have any other suitable property. The propulsion mechanism can be located proximal the nose cone, proximal the entanglement mechanism, between the drag mechanism and entanglement mechanism, between the avionics and the entanglement mechanism, or be arranged in any other suitable position. In one variation, the propulsion mechanism is arranged within a propulsion mechanism chamber, defined by the airframe, that is arranged adjacent the entanglement mechanism volume (e.g., nose cone volume). However, the propulsion mechanism can be arranged in any other suitable location.

When the propulsion mechanism is arranged proximal the avionics or other pressure- or force-sensitive component, the interdiction module can additionally include thermal and/or force insulation arranged between the propulsion mechanism and the pressure- or force-sensitive component. Examples of thermal insulation and/or force insulation include: air gaps, foam padding, dampers, intermediary chambers, flywheels, heat and/or force dispersion channels, or any other suitable thermal and/or force insulation. Additionally or alternatively, the propulsion mechanism can be arranged to minimize thermal and/or force transmission to the pressure- or force-sensitive component. For example, the propulsion mechanism can be substantially unidirectional (e.g., wherein the resultant force and/or heat is directed substantially in one direction), wherein the propulsion mechanism is arranged such that the resultant heat and/or force is directed away from the sensitive component. In a specific example, the propulsion mechanism and sensitive component (e.g., avionics) can be substantially aligned along the airframe longitudinal axis, with the propulsion mechanism proximal the nose cone. In this specific example, the propulsion mechanism can be aimed toward the nose cone, away from the avionics, to decrease avionics exposure to heat and/or forces generated by propulsion mechanism operation.

The propulsion mechanism is preferably actively controlled by the avionics, but can alternatively be passively controlled. In a first variation of active control, the propulsion mechanism is remotely triggered by a remote control signal received by the avionics. In a second variation of active control, the propulsion mechanism is automatically triggered by the avionics, based on sensor measurements received by the avionics (e.g., accelerometer measurements, gyroscope measurements, proximity sensors, GPS, etc.). In a first variation of passive control, the propulsion mechanism is automatically triggered based on a timer, wherein the timer can be automatically started upon interdiction module launch. In a second variation of passive control, the propulsion mechanism is automatically triggered by complete or near-complete degradation of a degradation system (e.g., a pin that gradually shakes loose after interdiction module launch, adhesive that loses adhesion upon application of the launch heat or pressure, etc.). However, propulsion mechanism operation can be otherwise controlled.

The interdiction module can include one or more propulsion mechanisms. When the interdiction module includes multiple propulsion mechanisms, the multiple propulsion mechanisms can be fluidly connected to or fluidly isolated from each other. The multiple propulsion mechanisms can additionally be fluidly connected to or fluidly isolated from discrete force endpoints. However, the multiple propulsion mechanisms can be otherwise fluidly related. The multiple propulsion mechanisms can be concurrently operated, serially operated, or operated in any other suitable time relation. The multiple propulsion mechanisms can be substantially identical or different.

3.1.1 Force Transfer Mechanism

The propulsion mechanism can be physically connected to the entanglement mechanism (e.g., the deployment mechanism), the casing (e.g., the nose cone), the drag mechanism, or to any other suitable force endpoint. The propulsion mechanism is preferably physically connected to the force endpoint by the force transfer mechanism, but can be connected through any other suitable mechanism. The interdiction module preferably includes a plurality of force transfer mechanisms (e.g., one per force endpoint, one for a subset of force endpoints, etc.), but can alternatively include a single force transfer mechanism or any other suitable number of force transfer mechanisms. Each force transfer mechanism is preferably connected to a single force endpoint, but can alternatively be connected to multiple force endpoints. Each force endpoint is preferably connected to a single force transfer mechanism, but can alternatively be connected to multiple force transfer mechanisms.

In a first variation, the force transfer mechanism includes a mechanical linkage. For example, the propulsion mechanism can be connected to a piston that drives one or more deployment mechanisms out of the airframe.

Figure 14:
FIGS. 14 and 15 are sectional views of a first and second force transfer mechanism variant, respectively.
Figure 15:
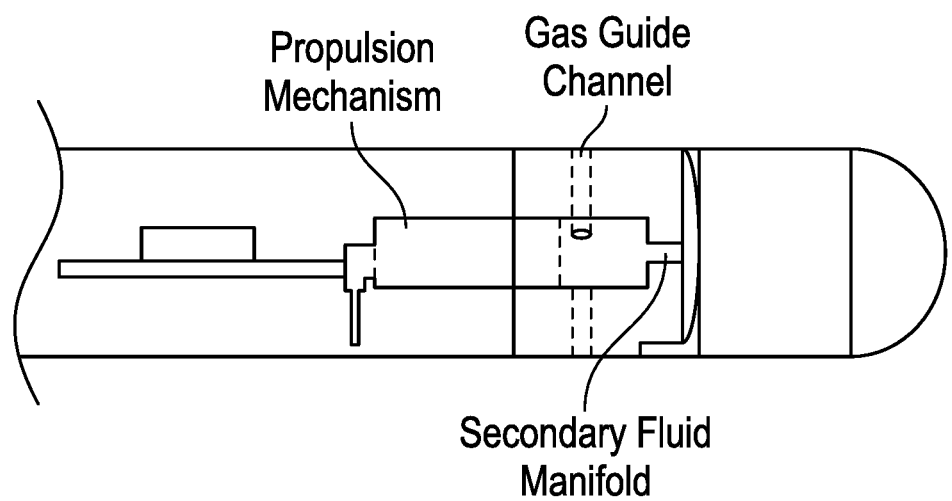
Figure 16:
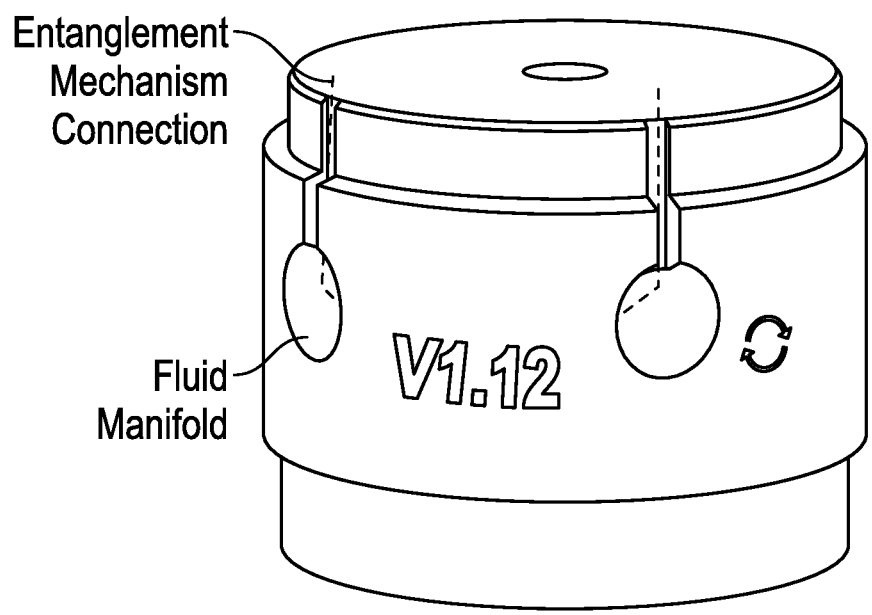
FIG. 16 is an isometric view of a variation of the airframe exterior and fluid manifold outlets.
Figure 17:
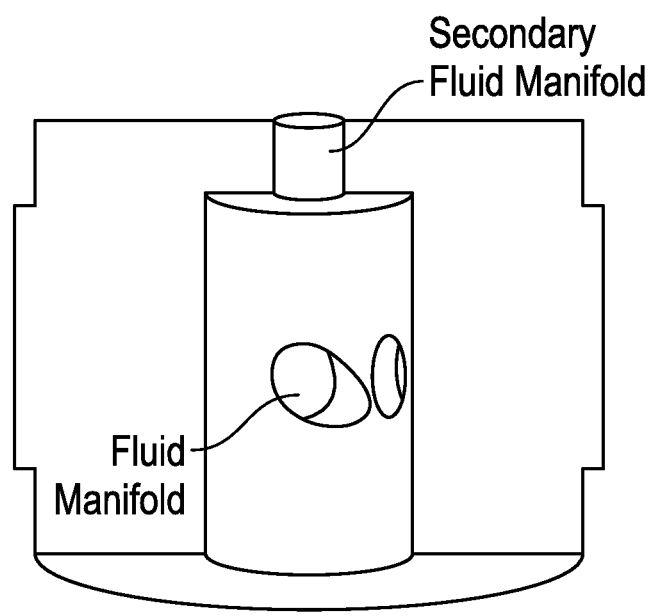
FIG. 17 is a sectional view of the variant of FIG. 16.
Figure 18:
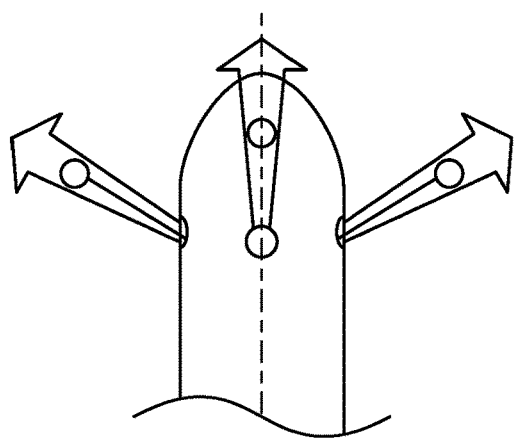
FIG. 18 is a schematic representation of a first variation of the deployment mechanism flight path.
Figure 19A:
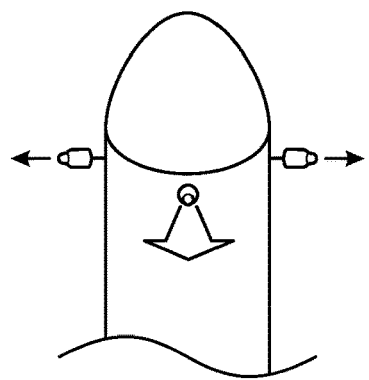
FIGS. 19A-19B are schematic representations of a second variation of the deployment mechanism flight path, pre- and post-deployment mechanism deployment, respectively.
Figure 19B:
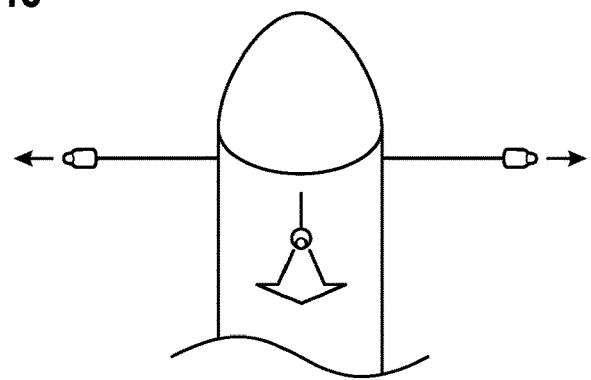
Figure 20A:
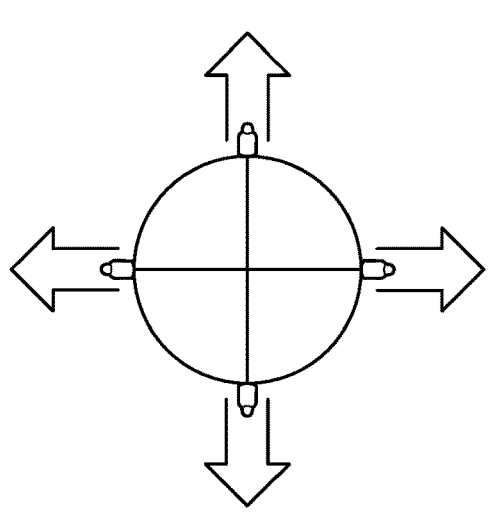
FIGS. 20A-20B are top view representations of the second variation of the deployment mechanism flight path, pre- and post-deployment mechanism deployment.
Figure 20B:
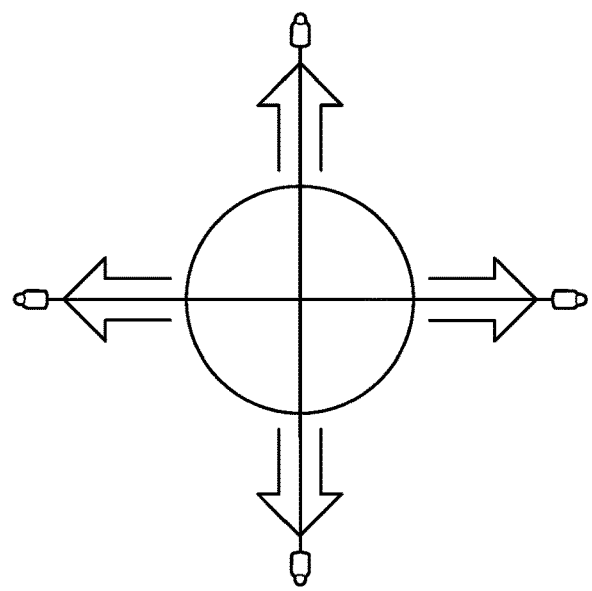

In a second variation, the force transfer mechanism includes a set of fluid manifolds fluidly connecting the propulsion mechanism to the force endpoints (examples shown in FIGS. 14 and 15). The fluid manifolds preferably extend from the airframe interior (e.g., the propulsion mechanism) to the airframe exterior, but can alternatively extend along any other suitable portion of the airframe. The fluid manifolds preferably extend radially outward from the airframe interior (e.g., from the airframe longitudinal axis), but can alternatively extend parallel to the airframe longitudinal axis, or extend in any other suitable direction. The fluid manifolds preferably extend at a non-zero angle to the airframe longitudinal axis, but can alternatively extend parallel the longitudinal axis or extend at any other suitable angle. The non-zero angle is preferably between 0 and 90 degrees to the longitudinal axis, more preferably between 30 and 45 degrees to the longitudinal axis, but can alternatively be any other suitable angle. The fluid manifolds preferably extend toward the nose cone (e.g., wherein the angle is measured from the airframe first end, example shown in FIGS. 16, 17, and 18), but can alternatively extend toward the tail of the airframe, be perpendicular to the longitudinal axis (examples shown in FIGS. 19A-20B), or extend in any other suitable direction. The fluid manifolds are preferably defined through the airframe thickness, but can alternatively be defined by secondary manifolds assembled to the airframe (e.g., tubes), or by any other suitable component. In a specific example, the secondary manifolds can be arranged within the nose cone volume. When the interdiction module includes multiple fluid manifolds, the fluid manifolds can be substantially evenly distributed about the interdiction module (e.g., about the longitudinal axis, etc.), unevenly distributed, or otherwise distributed.

Figure 21:
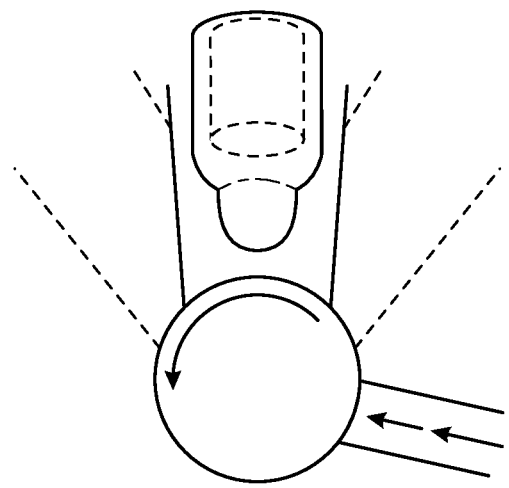
FIG. 21 is a schematic representation of a first variation of a flow modification feature.
Figure 22:
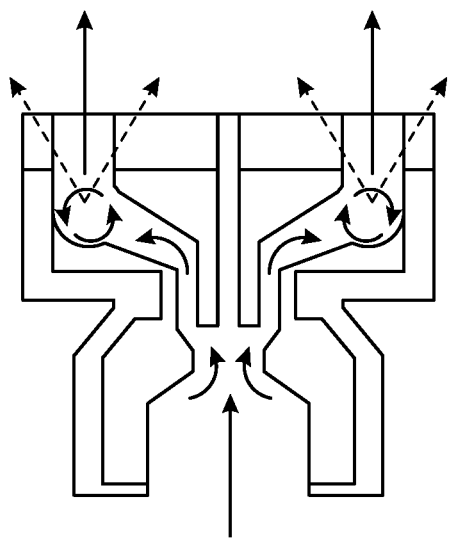
FIG. 22 is a schematic representation of the first variation of a flow modification feature in operation.

The fluid manifolds are preferably substantially straight, but can alternatively be curved (e.g., along the airframe radius, spiral about the airframe longitudinal axis, etc.), boustrophedonic, or have any other suitable configuration. The fluid manifolds preferably have a substantially constant cross section along their lengths, but can alternatively have variable cross-sections (e.g., decrease or increase with distance away from the interior). The fluid manifolds can additionally include flow modification features that function to modify the fluid flow generated by the expanding fluid. Examples of fluid flow parameters that can be modified include: inducing laminar flow, inducing turbulent flow, inducing rotational flow (examples shown in FIGS. 21 and 22), redirecting flow, or modifying any other suitable parameter of the fluid flow through the fluid manifold. Examples of flow modification features include interior features, such as spirals, fins, pins, and baffles; valves between the propulsion mechanism and fluid manifold; or any other suitable flow modification feature or component.

In one example of the second variation, the airframe can define a set of fluid manifolds (gas guide channels) that extend radially outward, at an angle, from the propulsion mechanism to the airframe exterior. The deployment mechanisms (e.g., net weights) are nested within the external end of the fluid manifold (e.g., fluid manifold outlet), and are physically connected to the entanglement mechanism (e.g., net) by a set of lines. The entanglement mechanism is stored within the nose cone volume (e.g., lumen defined between the nose cone and the fuselage), such that the lines extend from the nose cone volume, along the airframe exterior, and into the fluid manifold housing the respective deployment mechanism. The lines and/or deployment mechanisms can be retained within the fuselage by an external cap, adhesive, clips, or any other suitable retention mechanism blocking the exterior end of the fluid manifold and/or retaining the lines along the airframe body. The airframe can additionally define a secondary fluid manifold (e.g., a bleed channel) fluidly connecting the propulsion mechanism to the nose cone volume. When the propulsion mechanism is triggered, the resultant pressurized fluid expansion forces fluid through the gas guide channels and bleed chamber, concurrently pressurizing the interior section of the fluid manifold, which forces the net weights radially outward, along the fluid manifold length, and pressurizes the nose cone volume, which forces the nose cone to disengage from the fuselage. However, the force transfer mechanism can be configured and operated in any other suitable manner.

3.2 Entanglement Mechanism

The entanglement mechanism of the interdiction module functions to intercept, entangle, reroute, halt, or otherwise modify aerial system flight. The entanglement mechanism preferably functions to interfere with motive mechanism of a target aerial system (e.g., by entangling the motive mechanism), but can alternatively or additionally modify aerial system flight in any other suitable manner. The motive mechanism of the aerial system can include: rotors, jets, propellers, motors, wheels, legs, wings, or any other suitable mechanism capable of propelling the aerial system. In operation, the entanglement mechanism is preferably deployed by the propulsion force generated by the propulsion mechanism, but can alternatively be deployed in any other suitable manner. The entanglement mechanism is preferably deployed concurrently or soon after nose cone release, but can alternatively be deployed at any other suitable time. The entanglement mechanism is preferably deployed by the same propulsion mechanism that releases the nose cone, but can alternatively be deployed by a second propulsion mechanism.

Figure 25:
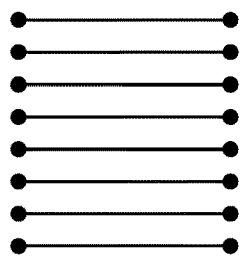
FIG. 25 is a schematic representation of a third variation of the entanglement mechanism.

In a first variation, the entanglement mechanism includes one or more monofilaments, wherein the set of monofilaments can be concurrently or serially deployed from the interdiction module (example shown in FIG. 25). Each monofilament can be connected to one or more deployment mechanisms at: a first end, both ends, along the filament body, or at any other suitable location.

Figure 23:
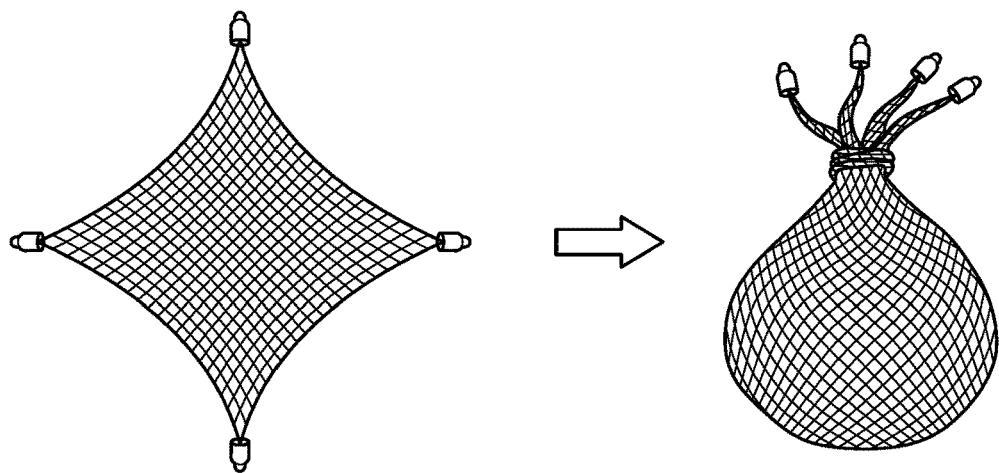
FIG. 23 is a schematic representation of a first variation of the entanglement mechanism.
Figure 24:
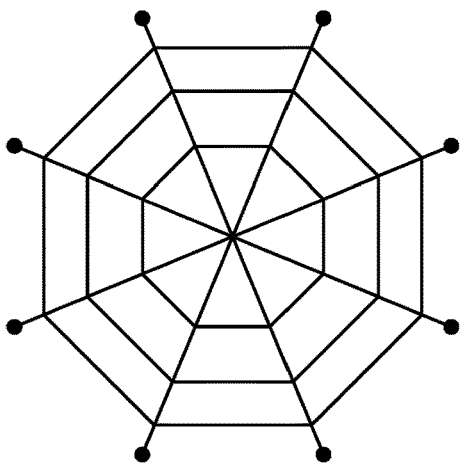
FIG. 24 is a schematic representation of a second variation of the entanglement mechanism.
Figure 26:
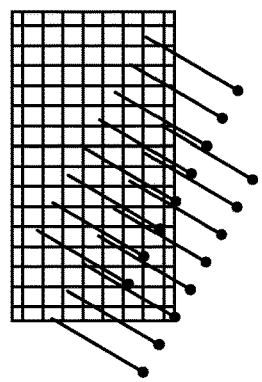
FIG. 26 is a schematic representation of a fourth variation of the entanglement mechanism.
Figure 27:
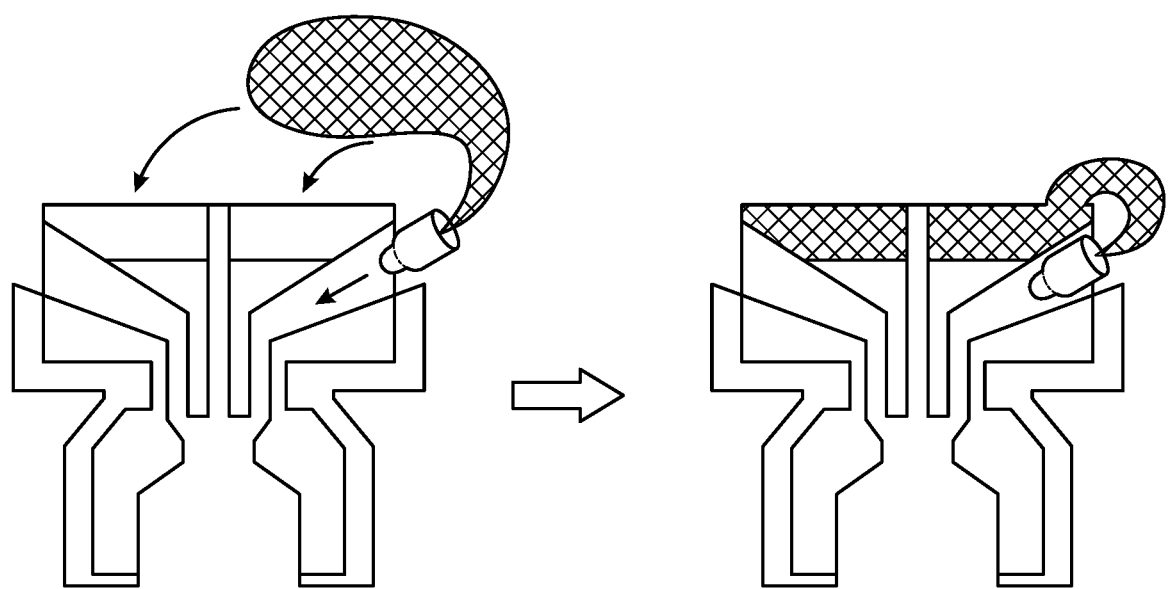
FIG. 27 is a schematic representation of a first variation of entanglement mechanism loading into the airframe.
Figure 28:
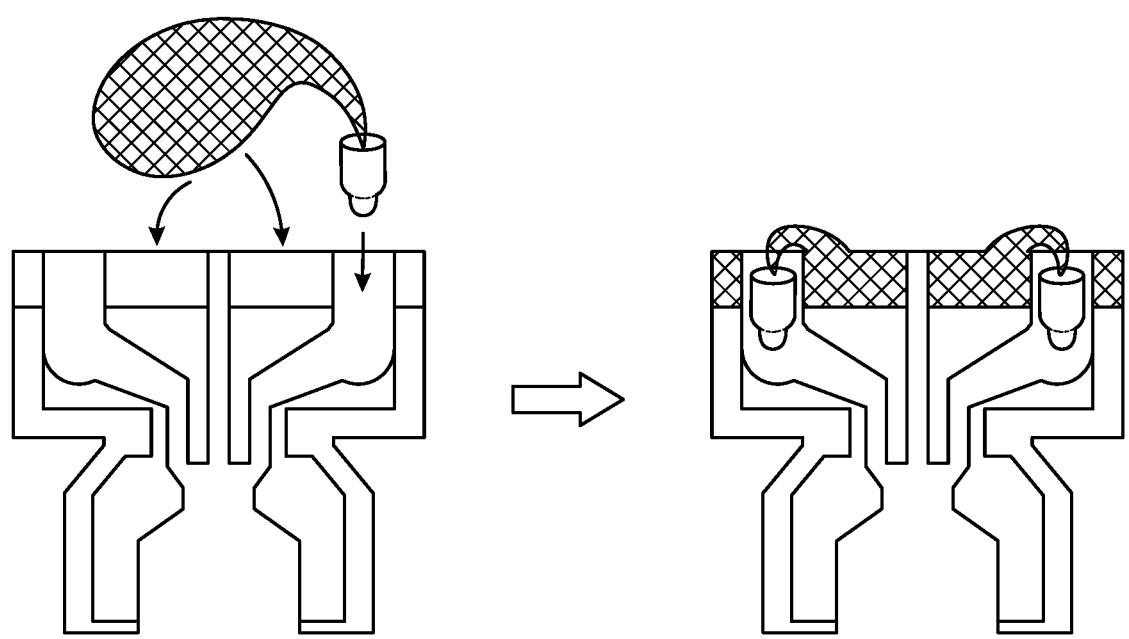
FIG. 28 is a schematic representation of a second variation of entanglement mechanism loading into the airframe.

In a second variation, the entanglement mechanism includes a net (e.g., a reticulated mechanism, retiary mechanism). The net can be substantially flat, parabolic, or have any other suitable structure. The net profile can be rectangular (example shown in FIG. 23), circular, polygonal, or have any other suitable shape. The net fibers can be woven into a grid, into an arcuate pattern, into a radial pattern (e.g., a spider web pattern, example shown in FIG. 24), or be woven into any other suitable pattern. The net can additionally include filaments (e.g., monofilaments) attached to the net body, wherein the filaments can increase motive mechanism entrainment (example shown in FIG. 26). The filaments can be attached to the net fibers forming the net broad face, the net edge, or to any other suitable portion of the net. The filaments can be attached to the net along a single end, along both ends, along a portion of the filament body, or along any other suitable filament portion. The net can be connected to one or more deployment mechanisms: at a net corner, at the net edge, along a portion of the net body, or along any other suitable portion of the net. The net can be connected to the deployment mechanisms directly, by a tether, or by any other suitable connection. However, the entanglement mechanism can be any other suitable mechanism capable of modifying motive mechanism movement.

The deployed entanglement mechanism preferably defines a critical dimension (e.g., the major dimension), such as a maximum length, diagonal length, side length, depth, or any other suitable dimension. The length of the critical dimension is preferably 3 m, but can alternatively be between 2 m and 4 m, between 8 m to 50 m, between 9-10 m, or be any other suitable length. However, the deployed entanglement mechanism can have any other suitable set of dimensions or ratios. The entanglement mechanism is preferably substantially deformable (e.g., flexible, elastic, etc.), but can alternatively be substantially non-deformable (e.g., fixed length, stiff, rigid, etc.). The entanglement mechanism is preferably non-ferrous (e.g., non-magnetic), but can alternatively be magnetic. Threads of the entanglement mechanism can be braided, twisted, or otherwise constructed. The entanglement mechanism is preferably made of shear-resistant material, but can alternatively be made of any other suitable material. Examples of entanglement mechanism material include: Kevlar, carbon (e.g., carbon nanotubes), polyethylene, polypropylene, or any other suitable material.

The entanglement mechanism is preferably housed within the airframe until deployment, but can alternatively be partially or entirely exposed (e.g., arranged external the airframe). The entanglement mechanism is preferably arranged proximal the propulsion mechanism (e.g., adjacent the propulsion mechanism), but can additionally or alternatively be arranged proximal an end of the airframe (e.g., proximal the nose cone, proximal the tail, etc.), be arranged along the body of the airframe, or be arranged in any other suitable position relative to the airframe. The entanglement mechanism is preferably housed within the nose cone volume (e.g., wherein an airframe wall separates the entanglement mechanism and/or nose cone volume from the propulsion mechanism retention volume), but can alternatively be individually housed in another lumen defined by the airframe, be housed in a common lumen shared by another interdiction module component, or be housed in any other suitable volume. The entanglement mechanism can be folded into the storage volume, wound into the storage volume (e.g., wound along an axis normal to the entanglement mechanism plane), or otherwise packed into the storage volume.

The entanglement mechanism can be mechanically connected to one or more interdiction module components. In a first variation, the entanglement mechanism is not permanently connected to any other interdiction module components, such that the entanglement mechanism is physically disconnected from the interdiction module components after deployment.

In a second variation, the entanglement mechanism is connected to the airframe. The entanglement mechanism can be connected to the fuselage, the nose cone, or to any other suitable airframe component. The entanglement mechanism can be connected to the airframe component along the entanglement mechanism end, edge, corner, broad face, or along any other suitable portion of the entanglement mechanism. The entanglement mechanism can be connected to the airframe component and/or lift mechanism (e.g., parachute) by a tether, guide lines, adhesive, clips, or by any other suitable coupling mechanism. The coupling mechanism can have a fixed length, variable length (e.g., be a spring), or have any other suitable mechanical property. In one embodiment, the tether length can be tuned to maximize the time for entanglement mechanism deployment while minimizing the distance the entanglement mechanism would fall before a drag mechanism deploys. For example, the tether length can be 5%, 10%, 40%, 50%, 90%, or any other suitable proportion of an entanglement mechanism critical length (e.g., diagonal) and/or parachute length. However, the tether length can be otherwise determined When the entanglement mechanism is a net, the coupling mechanism can be wound into the net body, run along the net perimeter, tethered to one or more net corners (e.g., opposing corners, all corners, etc.), or be otherwise connected to the net.

However, the entanglement mechanism can be connected to the drag mechanism, the avionics, and/or to any other suitable component. The entanglement mechanism can be connected to the respective component along one or more of the entanglement mechanism portions described above, with one or more of the coupling mechanisms described above. However, the entanglement mechanism can be otherwise connected to the one or more interdiction module components.

The interdiction module preferably includes a single entanglement mechanism, but can alternatively include multiple entanglement mechanisms. The multiple entanglement mechanisms can be connected, or be separate and discrete. The multiple entanglement mechanisms can be concurrently deployed, serially deployed, or be deployed in any other suitable order. The multiple entanglement mechanisms can be deployed by the same propulsion mechanism, different propulsion mechanisms, or any other suitable number of propulsion mechanisms. The multiple entanglement mechanisms can be stored within the same volume or different volumes. The multiple entanglement mechanisms can be stacked (e.g., along the airframe longitudinal axis), arranged in an array, or otherwise arranged. The multiple entanglement mechanisms can be connected to the same interdiction module components, different interdiction module components, or to any other suitable set of interdiction module components. The multiple entanglement mechanisms can be substantially identical or different.

3.2.1 Deployment Mechanism

The entanglement mechanism can additionally include one or more deployment mechanisms, which function to supply mass and surface area for propulsion force application. In a specific example, deployment mechanism propulsion out of the interdiction module concurrently drags the entanglement mechanism out of the interdiction module and spreads the entanglement mechanism. The deployment mechanism can additionally function to generate additional entanglement force (e.g., wherein the motive force generated by the target's motive mechanism imparts inertia on the deployment mechanism, thereby further entangling the target), or perform any other suitable functionality.

Figure 29:
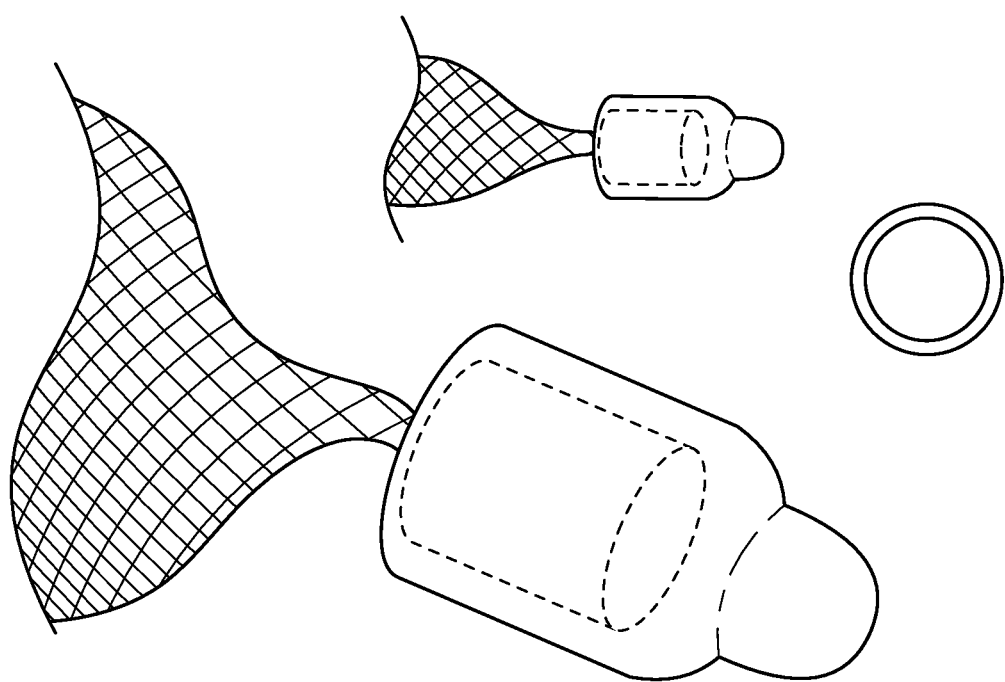
FIG. 29 is a schematic representation of a first variation of the deployment mechanism.

In a first variation, the deployment mechanism is a weight, example shown in FIG. 29. In operation, the propulsion mechanism operation forces the weight out of the interdiction module, wherein weight deployment subsequently unfurls the entanglement mechanism. The weight can be spheroid, ellipsoid, prismatic, ballistic, or have any other suitable form factor. The weight is preferably made of a high density material (e.g., metal, such as brass), but can alternatively be made of any other suitable material. The weight preferably has substantially the same diameter as the gas guide channel internal profile, but can alternatively have a smaller diameter (e.g., define a clearance fit with the gas guide channel internal profile), be substantially fluidly sealed against the gas guide channel interior by an o-ring, adhesive, or any other suitable seal, and/or be otherwise coupled to the gas guide channel. For example, the weight can be smaller than the internal profile, such that some gas can leak through upon propulsion mechanism operation. The weight can be tethered to the entanglement mechanism at a first end, through the weight longitudinal axis, or otherwise tethered to the entanglement mechanism. In one example, the weights can include a through hole extending along a longitudinal axis, wherein the entanglement mechanism tether is threaded through the through-hole, knotted, and adhered to the weight, which functions to couple the entanglement mechanism to the weight and seal the hole. In one embodiment, the mass of the weight can be tuned to impedance match the energy needed to fully spread the entanglement mechanism (e.g., net) without the weights bouncing back. For example, the weight mass can be selected such that the kinetic energy imparted to the weight by the gas acting in the gas guide channel, can be 2%, 5%, 10%, or any other suitable ratio of the unfurling energy. However, the weight mass can be otherwise determined.

In a second variation, the deployment mechanism is a drag mechanism. In operation, the propulsion mechanism operation inflates the drag mechanism out of the interdiction module, wherein drag mechanism inflation and/or expansion subsequently unfurls the entanglement mechanism. The drag mechanism can be a balloon, parachute, kite, wing, or any other suitable drag mechanism.

In a third variation, the deployment mechanism is the nose cone. In operation, the propulsion mechanism operation blows off the nose cone from the fuselage, wherein the nose cone pulls on and subsequently unfurls the entanglement mechanism. However, the entanglement mechanism can include any other suitable deployment mechanism.

The deployment mechanism is preferably connected to the entanglement mechanism, but can alternatively be connected to any other suitable component. The deployment mechanism can be connected to the edge, corner, end, body, and/or any other suitable portion of the entanglement mechanism. The entanglement mechanism preferably includes multiple deployment mechanisms, but can alternatively include a single deployment mechanism. The multiple deployment mechanisms are preferably substantially evenly distributed across the entanglement mechanism, but can alternatively be unevenly distributed or otherwise distributed across the entanglement mechanism. The distribution mechanisms can be directly connected to the entanglement mechanism (e.g., woven into the entanglement mechanism body), connected by a tether or a set of lines, or otherwise connected to the entanglement mechanism. In a specific example, the entanglement mechanism includes multiple net weights distributed about the entanglement mechanism perimeter. The net weights rest within the gas guide channels, and are shot out by the expanding gas generated by the propulsion mechanism.

The distribution mechanism is preferably transiently coupled to the airframe, but can alternatively be substantially permanently coupled to the airframe or be otherwise coupled to the airframe. The distribution mechanism is preferably fluidly connected to the airframe exterior, but can be otherwise arranged. The distribution mechanism is preferably radially distributed about the airframe longitudinal axis, but can alternatively be arranged along the airframe longitudinal axis, or be otherwise arranged. The distribution mechanism is preferably arranged proximal the nose cone, but can alternatively be arranged in any other suitable position.

The entanglement mechanism can additionally include a constriction mechanism that functions to cinch the entanglement mechanism about an entrained system. In a first variation, the constriction mechanism includes a fiber (e.g., rope, string, thread, etc.) extending through or proximal the entanglement mechanism edge. A first end of the fiber is statically connected to the entanglement mechanism, and the second end of the fiber is weighted (e.g., with the deployment mechanism or a secondary weight), wherein the fiber translates relative to the entanglement mechanism along the fiber length. In a second variation, the constriction mechanism includes a set of magnets, wherein one or more of the magnets can be magnetically attracted to a second magnet of the set, the aerial system, a portion of the entanglement mechanism, and/or a portion of the airframe. The magnets can be arranged along the perimeter, edge, corner, body, or any other suitable portion of the entanglement mechanism. However, the entanglement mechanism can include any other suitable constriction mechanism.

The interdiction module can additionally include one or more secondary motion disruption mechanisms that function to disrupt aerial system motion. The secondary motion disruption mechanism can be operated concurrently or asynchronously with the entanglement mechanism. Secondary motion disruption mechanism operation is preferably controlled by the avionics, but can alternatively be controlled by any other suitable system. Examples of the secondary motion disruption mechanism include: an electromagnetic force generator, a light generator (e.g., a laser), an acoustic wave generator, ballistics (e.g., birdshot with a secondary propellant), a deployable bola, a secondary net, a set of rigid rods, or any other suitable motion disruption mechanism.

3.3 Avionics

The avionics of the interdiction mechanism functions to control entanglement mechanism deployment. The avionics can additionally or alternatively function to: control propulsion mechanism operation (e.g., initiate or control propulsion force generation); control drag mechanism deployment; maintain communications links; receive control instructions from a remote device and control module component operation based on the control instructions; control fusing, flight control, net firing, parachute release, target tracking, and target sensing; generate steering instructions for the module; generate control instructions based on on-board and/or remote sensor data (e.g., automatically and/or in real-time or near-real time); and/or perform any other suitable functionality. The interdiction module can include one or more avionics of similar or different type.

The avionics preferably include a processing system with one or more processors (e.g., CPU, GPU, microprocessor, etc.), but can alternatively include any other suitable computing system. The avionics can additionally include: on-board memory (e.g., flash, RAM, etc.; that can function to log interdiction mechanism operation parameters, store control instructions, or perform other functionalities), a clock, a communications module, sensors, a power source, visual indicators (e.g., LEDs), and/or or any other suitable component. The avionics components can be cohesive (e.g., arranged on the same board), distributed throughout the interdiction module, or otherwise arranged. The interdiction module can include one or more processing systems of similar or different type.

The communications module of the avionics functions to send and/or receive communications from a communications endpoint (e.g., remote control, user device, such as a smartphone, laptop, tablet, etc.). The communications module can be a radio (e.g., a wireless transceiver), a wired connector, or any other suitable communications module. The communications module can be an IR system, RF system, beacon system (e.g., ultrasound, RF), light modulation system, NFC system, Wi-Fi system, GSM system, Bluetooth system, mesh system, cellular system, Ethernet system, powerline communication system, or be any other suitable communication system. The interdiction module can include one or more communications module of similar or different type.

The sensors of the avionics function to measure ambient environment and/or interdiction module parameters. The sensor can be a motion detector, distance sensor, imaging system (e.g., CCD sensor, CMOS sensor, monoscopic camera, stereoscopic camera, etc.), depth camera (e.g., structured light sensor systems), wavelength-specific camera (e.g., multispectral camera, hyperspectral camera, visible spectrum camera, IR camera, etc.), inertial or orientation sensor (e.g., inertial measurement units, accelerometers, gyroscopes, magnetometer, tilt sensors, etc.), force sensor (e.g., pressure sensors, etc.), touch sensor (e.g., a set of electrodes, etc.), motor monitoring systems (e.g., rotary encoders, mechanical encoders, magnetic encoders, optical encoders, resolvers, Hall effect sensors, back EMF monitoring systems, etc.), light sensors, audio sensors (e.g., microphones), location sensors (e.g., GPS system, trilateration system, etc.), temperature sensors, pressure sensors, or any other suitable sensor. Other examples of sensors that can be included include: LIDAR, ultrasound, radar, CV, or any other suitable set of sensors. The interdiction module can include one or more sensors of similar or different type.

The power source of the avionics functions to power the interdiction module components. For example, the power source can power the sensors, communications module, and the initiator for the propulsion mechanism. In one variation, the power source can additionally function as the initiator. The power source can be a battery (e.g., primary battery, secondary battery, etc.), fuse, set of chemical reagents, energy harvesting mechanism (e.g., that harvests kinetic energy from airflow about the fuselage), or any other suitable power source. The interdiction module can include one or more power sources of similar or different type, wherein different power sources can be connected to different power sinks or the same power sink.

Figure 30:
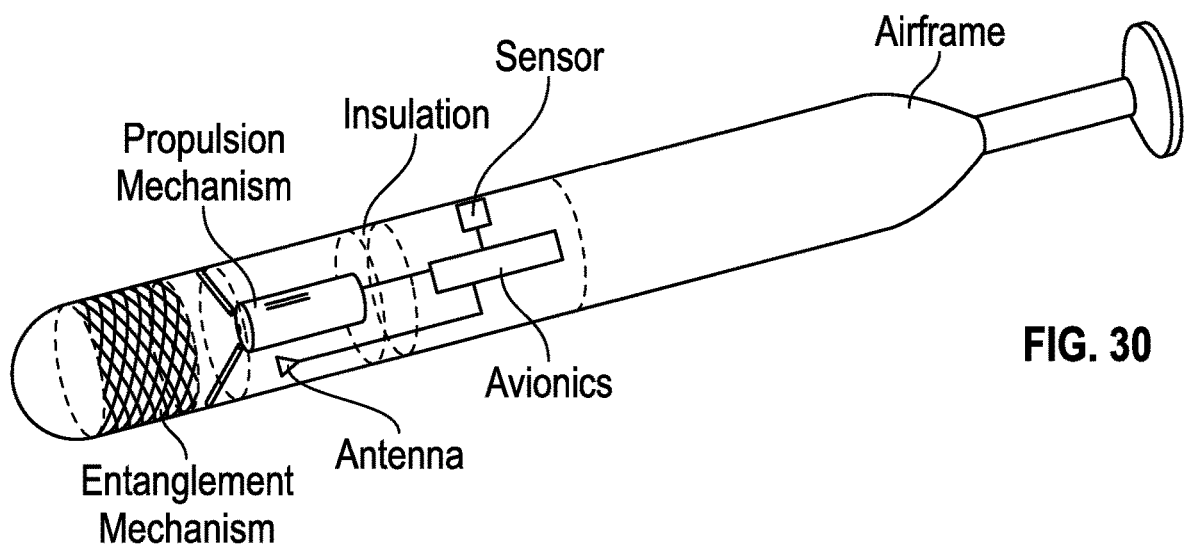
FIG. 30 is a schematic representation of a variation of avionics arrangement within the airframe.

The avionics are preferably located within the airframe, but can alternatively be located external the airframe. The avionics are preferably mounted to the airframe, but can be suspended from the airframe or otherwise coupled to the airframe. The avionics can be rigidly mounted to the airframe, actuatably mounted to the airframe (e.g., by springs, joints, dampeners, etc.), or otherwise mounted to the airframe. The avionics can be arranged between the drag mechanism and the propulsion mechanism, distal the entanglement mechanism across the propulsion mechanism, distal the entanglement mechanism, or in any other suitable location. In one variation, as shown in FIG. 30, the avionics are arranged adjacent the propulsion mechanism, wherein the avionics are separated from the propulsion mechanism by an air gap, which functions to insulate the avionics from the heat and/or forces generated by the propulsion mechanism.

The avionics are preferably wired to the control endpoints, but can alternatively be wirelessly connected to the control endpoints. The control endpoints can include: the propulsion mechanism (e.g., the initiator), the drag mechanism, the steering mechanism, the remote control system, or any other suitable controllable component. However, the avionics can include any other suitable component and have any other suitable configuration.

3.4 Airframe

Figure 31:
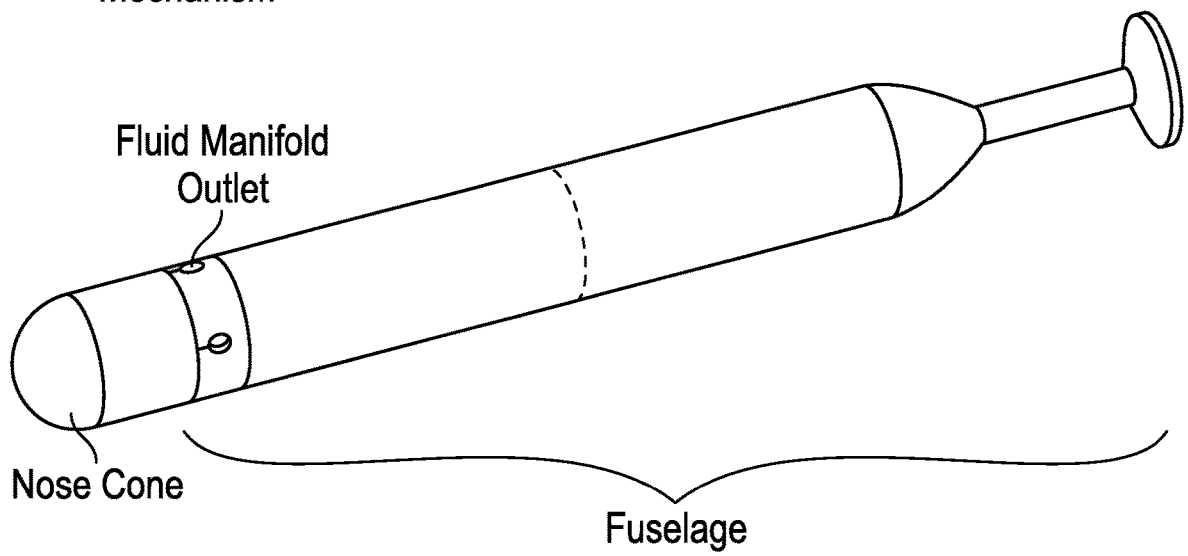
FIG. 31 is a schematic representation of a variation of the airframe.
Figure 32:
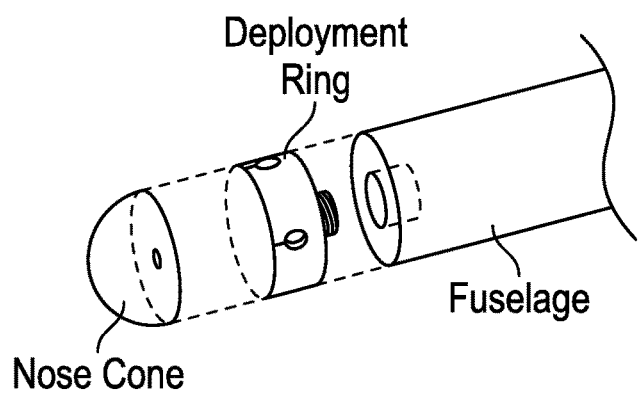
FIG. 32 is an exploded view of a variation of the airframe.

The airframe of the interdiction mechanism functions to house and retain components (e.g., during storage, during flight), and to transport the interdiction module components as a unitary module until entanglement mechanism deployment. The airframe can additionally function as the entanglement mechanism deployment mechanism, a drag mechanism deployment mechanism, an EMF shield, or perform any other suitable functionality. The airframe preferably substantially encapsulates the components, but can alternatively be an open frame. The airframe can be entirely or partially made of: metal, plastic, ceramic, or any other suitable material. The airframe can be printed, milled, or otherwise manufactured. As shown in FIG. 31, the airframe preferably includes a nose cone and a fuselage, but can alternatively or additionally include any other suitable component. Airframe components can be coupled with interference fits, transition fits, clearance fits, coupling mechanisms (e.g., adhesives, clips, screws, etc.), seals (e.g., O-rings, interface seals with a predetermined cracking pressure), or any other suitable coupling mechanism.

The airframe can be radially symmetric, asymmetric, or otherwise configured. The airframe can be substantially cylindrical, prismatic, or have any other suitable shape. The airframe can additionally or alternatively define different diameters in different sections. In one example, a first section of the airframe (e.g., proximal the nose cone) defines a diameter is smaller than the launcher barrel diameter (e.g., define a clearance fit with the launcher), while a second section of the airframe (e.g., proximal the tail) defines a diameter substantially equal to the launcher barrel diameter (e.g., define an interference or transition fit with the launcher). However, the airframe can be otherwise configured.

Figure 33:
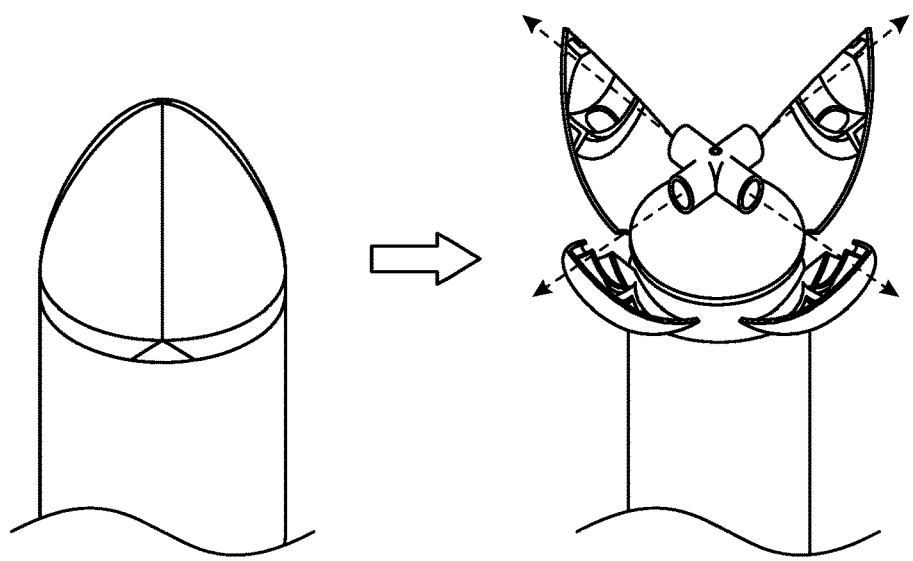
FIG. 33 is a schematic representation of a first variation of nose cone actuation to expose the entanglement mechanism.
Figure 34:
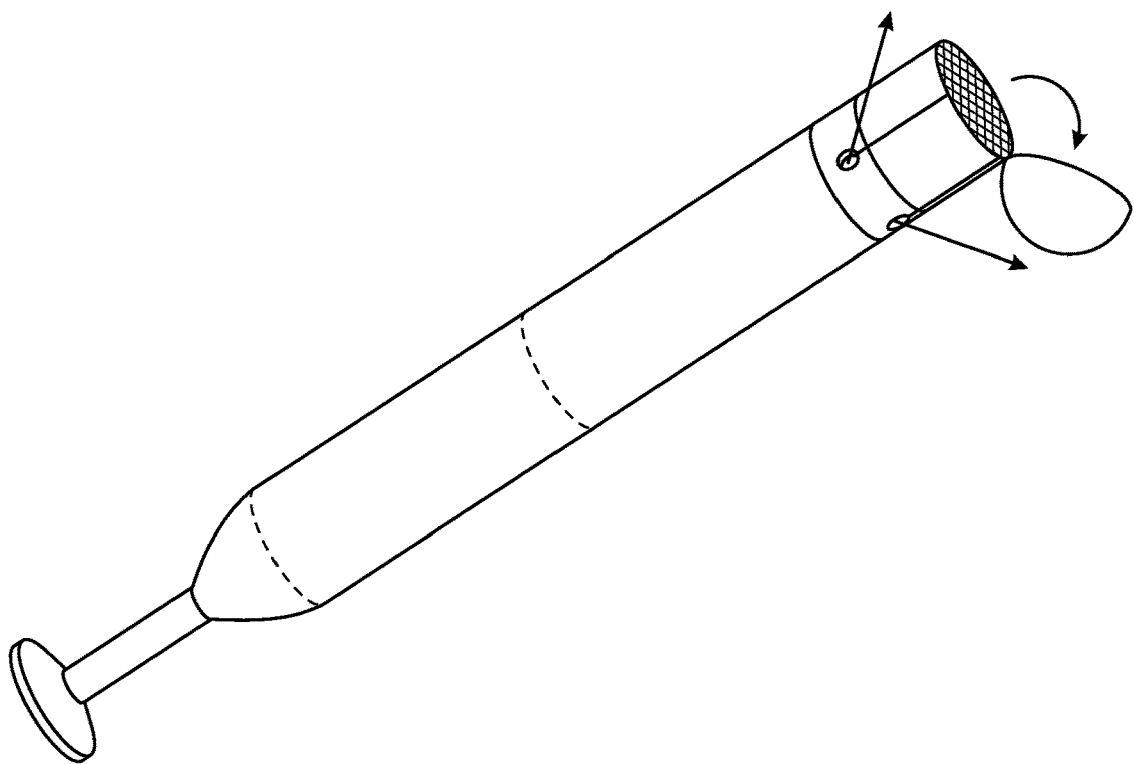
FIG. 34 is a schematic representation of a second variation of nose cone actuation to expose the entanglement mechanism.
Figure 35A:
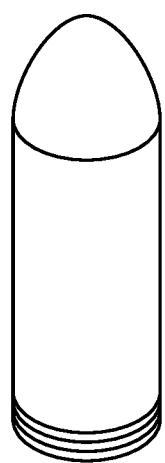
FIGS. 35A-35F are schematic representations of a first, second, third, fourth, fifth, and sixth drag feature example, respectively.
Figure 35B:
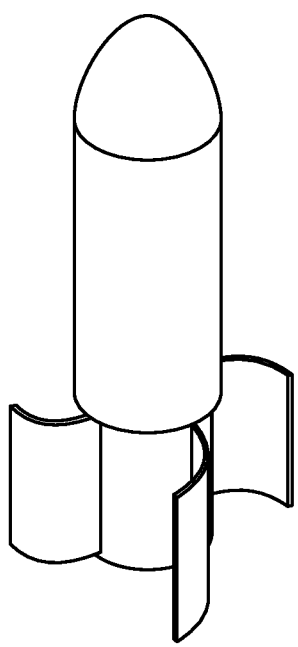
Figure 35C:
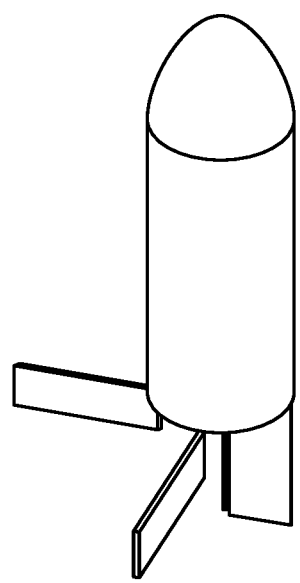
Figure 35D:
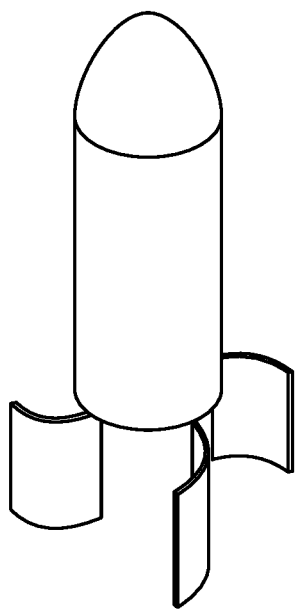
Figure 35E:
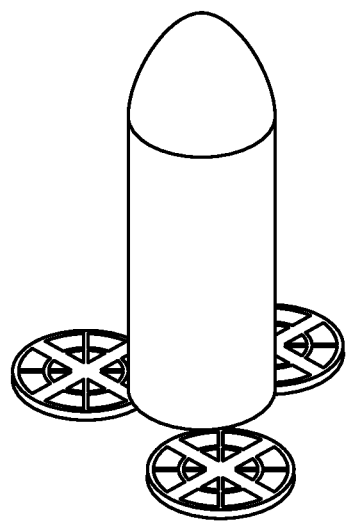
Figure 35F:
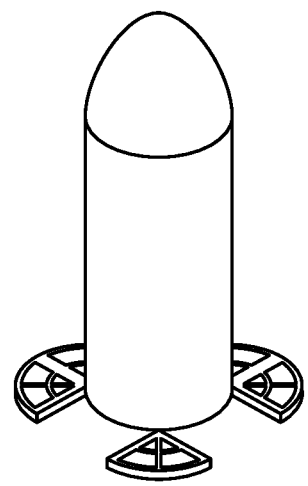

The nose cone of the airframe functions to decrease atmospheric drag on the interdiction module during flight. The nose cone can additionally function to transiently retain the entanglement mechanism. The nose cone can be flexible or rigid. The nose cone can include a rounded profile to provide a low ballistic coefficient, a pointed profile, a prismatic profile, or have any other suitable profile. The nose cone is preferably coupled to a first end of the fuselage, opposing the steering mechanism or tail, but can alternatively be coupled to any other suitable portion of the fuselage. The nose cone can cooperatively define an entanglement mechanism volume with the fuselage, wherein the entanglement mechanism volume can be determined based on the parameters of the enclosed entanglement mechanism or otherwise determined. In one example, the entanglement volume is substantially equal to or slightly larger (e.g., 5% larger, 10% larger, etc.) than the folded volume of the entanglement mechanism. This can function to prevent the entanglement mechanism from knotting or tangling. The nose cone is preferably removably coupled to the fuselage by a coupling mechanism, but can alternatively be permanently coupled to the fuselage or otherwise coupled to the fuselage. The coupling force is preferably weaker than the propulsion force, but can alternatively be substantially similar to the propulsion force or greater than the propulsion force. The coupling mechanism can be a magnetic element, a mechanical coupling mechanism (e.g., one or more clips), adhesive, a pin, friction (e.g., generated by an interference fit), threads (e.g., wherein the nose cone is screwed onto the fuselage), or any other suitable coupling mechanism. The nose cone-fuselage can include one or more o-rings or any other suitable interface. The nose cone can be a unitary piece, have a composite construction (e.g., constructed from one or more pieces), or have any other suitable construction. In a first variation, the composite nose cone can be split radially into multiple pieces (example shown in FIG. 33). In a second variation, the composite nose cone can be split longitudinally into multiple pieces. However, the composite nose cone can be split in any other suitable manner into any suitable number of pieces. The nose cone can additionally include sensors (e.g., proximity sensors, light sensors, acoustic sensors, receivers, antennae, LIDAR, cameras, ultrasonic sensors etc.) or include any other suitable component.

The fuselage of the airframe functions to retain the propulsion mechanism and avionics. The fuselage can additionally function to define the force transfer mechanisms (e.g., gas guide channels), house the drag mechanism, and/or perform any other suitable functionality. The fuselage is preferably radially symmetric (e.g., form a cylinder), but can alternatively be radially asymmetric, prismatic, or have any other suitable profile. The interdiction module components are preferably stacked along the longitudinal axis, but can alternatively be stacked parallel to the longitudinal axis or packed into the fuselage in any other suitable configuration. The fuselage can be a unitary piece or have a composite construction.

The fuselage can define a lumen, a longitudinal axis, a first end, and a second end. The lumen preferably functions to enclose the interdiction module components, and is preferably a continuous lumen, but can alternatively be compartmentalized into multiple connected or isolated sub-lumens. The first end is preferably aligned opposing the second end along the longitudinal axis, but can alternatively be otherwise arranged. The first end preferably mounts to the nose cone, but can alternatively function as the tail of the airframe. The first end can additionally define one or more force transfer mechanisms. In a first example, the first end defines the gas guide channels that extend radially outward from the lumen to the fuselage exterior. In a second example, the first end defines the bleed channel, wherein the bleed channel extends parallel the longitudinal axis: from the lumen, through the fuselage thickness, to the fuselage exterior. However, the first end can include or define any other suitable feature. The second end preferably functions as the airframe tail, but can alternatively perform any other suitable function. The fuselage exterior can include drag features (e.g., fins, tails, baffles, etc.), ballistic features (e.g., grooves), or include any other suitable feature. The fuselage can additionally include vents that function to release pressure within the fuselage body.

The airframe can additionally include a tail that functions to modify or otherwise control the interdiction module aerodynamics during flight. The tail can be substantially permanently mounted to the fuselage, removably coupled to the fuselage (e.g., via friction, clips, etc.), or otherwise mounted to the fuselage. The tail can couple to the end of the fuselage opposing the nose cone, but can alternatively be mounted to any other suitable portion of the airframe. The tail-fuselage can include one or more o-rings or any other suitable interface. In one variation of the airframe, the tail is removably mounted to the fuselage, and is released to expose the drag mechanism (example shown in FIG. 37). The tail can be blown off by a secondary propulsion mechanism, blown off by drag mechanism deployment, or otherwise released. However, the tail of the airframe can be formed as a unitary piece with the fuselage or otherwise manufactured. The tail can be made of carbon fiber, metal, plastic, or any other suitable material. The tail can additionally include sensors (e.g., IR velocity sensor, accelerometer, etc.) or any other suitable component.

The tail can mount the steering mechanism, define a drag mechanism opening for drag mechanism deployment (e.g., perpendicular the longitudinal axis, along the fuselage body, etc.), define a set of drag features (e.g., stabilization or control features), or define any other suitable feature. As shown in FIGS. 35A-35F, examples of drag features can include: longitudinal fins, radial fins, spiraling fins, aerofoils, actuatable flaps, or any other suitable feature. In a specific example shown in FIGS. 36A and 36B, the tail includes a rounded endcap configured to seal an end of the fuselage (e.g., the second end of the fuselage) and a stem connecting the endcap to a hex comb feature. The endcap can be rounded to accommodate rapid internal pressurization, be prismatic, or have any other suitable profile. The hex comb feature includes a circular band, arranged with the band plane perpendicular the stem, with a hexagonal open mesh extending within the band plane. However, the tail can include any other suitable construction, feature, or component.

The airframe can additionally include a force transfer mechanism that functions to transfer and/or disperse the fluid pressure from the secondary fluid manifold (e.g., bleed channel) to the entanglement mechanism. The force transfer mechanism can include a piston, cloth (e.g., fire-retardant cloth), or any other suitable force transfer mechanism. The force transfer mechanism can be arranged within the nose cone volume, the deployment mechanism, or in any other suitable location.

3.5 Drag Mechanism

The interdiction module can optionally include a drag mechanism that functions to apply a drag force on the entanglement mechanism. The drag mechanism is preferably employed to slow system descent after target interdiction (example shown in FIG. 37), but can alternatively or additionally be employed to aim the entanglement mechanism toward the target or be otherwise used. The drag mechanism can be deployed: before entanglement mechanism deployment, after entanglement mechanism deployment, before target interdiction, after target interdiction, or at any other suitable time. The interdiction module can include one or more drag mechanisms of similar or different type, wherein the drag mechanisms can be concurrently operated or asynchronously operated. The drag mechanism preferably has a large surface area and is lightweight, but can have any other suitable set of characteristics. The drag mechanism can be made of nylon, PTFE, Kevlar, metal, composite (e.g., polymer with material foil or lining), or any other suitable material.

In a first variation, the interdiction module includes a parachute. The parachute can include a set of shroud lines, which can be connected to the entanglement mechanism. In operation, the increased weight of the entrained target can pull on the parachute release mechanism, which deploys the parachute. Alternatively, the parachute can be deployed by expanding gas, a set of springs, tail cap removal, or be deployed in any other suitable manner. The parachute can be a round parachute, cruciform parachute, pull down apex parachute, Rogallo wing parachute, ribbon and ring parachute, ram-air airfoil (parafoil), rectangular parachute, tapered parachute, or be any other suitable parachute. In a second variation, the interdiction module includes an airfoil. The airfoil can be a singular piece, include multiple jointed pieces, or have any other suitable construction. However, the interdiction module can include a glider, balloon, or any other suitable drag mechanism capable of slowing entrained target descent.

The drag mechanism is preferably actively deployed, but can alternatively be passively deployed. In one example, the drag mechanism can be actively deployed by the avionics or another control system, based on sensor measurements, a timer, or any other suitable set of inputs. In a second example, the drag mechanism can be passively deployed upon application of a release force. The release force can be generated by the increased weight of the entrained target, the inertia of the frame tugging on the drag mechanism, the inertia of the deployment mechanism tugging on the drag mechanism, or be generated by any other suitable mechanism. The drag mechanism is preferably automatically deployed, but can alternatively be manually deployed (e.g., via remote control).

The drag mechanism is preferably enclosed within the airframe, but can alternatively be arranged external the airframe. The drag mechanism can be arranged: distal the entanglement mechanism, distal the propulsion mechanism, opposing the entanglement mechanism across the propulsion mechanism, proximal the avionics, proximal the second end of the airframe, proximal the first end of the airframe, in the nose cone, or in any other suitable location within the interdiction module. In one variation, the drag mechanism arranged within the airframe lumen along the second end of the airframe, and is fluidly connected to the drag mechanism opening. However, the drag mechanism can be otherwise arranged.

The drag mechanism is preferably substantially permanently connected to the entanglement mechanism by a coupling mechanism along the body, edges, ends, corners, or any other suitable portion of the entanglement mechanism, but can alternatively be removably connected to any suitable portion of the entanglement mechanism. In a specific example, the drag mechanism is coupled to one end of the constriction mechanism (e.g., fiber), such that the drag mechanism cinches the entanglement mechanism about an entrained target upon drag mechanism deployment. The coupling mechanism can be a set of fixed-length leads, a set of variable-length leads (e.g., springs, bungees, etc.), clips, adhesive, magnets, or any other suitable coupling mechanism. The drag mechanism can additionally be transiently or substantially permanently connected to the avionics, frame, steering mechanism, and/or any other suitable interdiction component.

In a first variation, the drag mechanism is transiently connected to the airframe and substantially permanently connected to entanglement mechanism and avionics, wherein the airframe falls away upon drag mechanism deployment and the drag mechanism slows entanglement mechanism, avionics, and entangled target descent.

In a second variation, the drag mechanism is permanently connected to the entanglement mechanism, airframe, and avionics, wherein the frame remains attached to the drag mechanism upon drag mechanism deployment. In a first embodiment of this variation, drag mechanism deployment can break the airframe into one or more pieces that are coupled to the drag mechanism (e.g., that adhere to or form the drag mechanism broad face, hang off the drag mechanism, etc.). In a second embodiment of this variation, the drag mechanism can egress the airframe upon deployment, wherein the airframe (and any enclosed components) hangs off the drag mechanism. In a third variation, the drag mechanism is permanently connected to the entanglement mechanism, avionics, and steering mechanism (e.g., portion of the airframe supporting the steering mechanism), such that the steering mechanism can be used to steer the drag mechanism after deployment. However, the drag mechanism can be permanently or transiently connected to any other suitable combination of interdiction module components.

The drag mechanism can additionally include one or more markers that function to identify the drag mechanism after deployment. Examples of markers include: an image (e.g., a QR code, barcode, etc.), an electromagnetic signal (e.g., RFID signal, Wi-Fi signal, etc.), an acoustic signal or any other suitable signal. The marker is preferably arranged along a broad face of the drag mechanism (e.g., along the canopy interior, along the canopy exterior), but can alternatively hang off the drag mechanism or be arranged in any other suitable location.

The drag mechanism can additionally include antennas, sensors, or any other suitable component. In one variation, the drag mechanism can include an antenna for an avionics radio. The antenna can: extend along the broad face of the drag mechanism (e.g., along an arcuate surface of the canopy, along a longitudinal axis, etc.), extend from the broad face of the drag mechanism (e.g., extend normal to the broad face, tangentially to the broad face, or extend at any other suitable angle), extend along a tether, leash, or shroud line for the drag mechanism, or extend along any other suitable portion of the drag mechanism. The antenna can be embedded into the drag mechanism (e.g., woven into the drag mechanism, deposited along the drag mechanism face, etc.), mounted to the drag mechanism, or otherwise attached to the drag mechanism.

3.6 Steering Mechanism

The interdiction module can optionally include a steering mechanism that functions to stabilize the interdiction module during flight, steer the interdiction module during flight, and/or steer the drag mechanism post-deployment. The steering mechanism is preferably mounted to the tail of the airframe, more preferably to the end of the fuselage opposing the end supporting the nose cone, but can alternatively be mounted to the end of the fuselage opposing the end storing the entanglement mechanism, to any other suitable portion of the airframe, to the drag mechanism, or be mounted to any other suitable interdiction module component. The steering mechanism can be active (e.g., controlled by the AVI or by remote control via the AVI), or passive. Examples of the steering mechanism include: jet engines, pulse jets, rockets, propellers (e.g., driven by electric motors, internal combustion motors, etc.), rotors, line spools (e.g., to steer the drag mechanism), or any other suitable steering mechanism.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A system, comprising:
a projectile comprising an airframe which at least houses an entanglement mechanism, a propulsion mechanism, a steering mechanism, and a drag mechanism, wherein the entanglement mechanism is configured to be tethered to the airframe, wherein the airframe includes a nose cap portion, a fuselage portion, and a tail portion, wherein the entanglement mechanism is housed within the nose cap portion, and the steering mechanism is mounted to the tail portion; and
a launcher capable of launching the projectile to within a close distance of an airborne target,
wherein as the projectile approaches the airborne target the projectile is first slowed down by the drag mechanism, and as the projectile slows down the propulsion mechanism causes the entanglement mechanism to be projected towards the airborne target,
wherein the entanglement mechanism is configured to arrest and capture the airborne target to tether the airborne target to the projectile, wherein the entanglement portion is configured to be coupled to the drag mechanism through the fuselage portion after the entanglement mechanism and the drag mechanism are deployed, wherein the deployed entanglement portion is configured to be deployed from the nose cap portion and the drag mechanism is configured to be deployed from the tail portion, and
wherein the drag mechanism is configured to slow down a speed at which the projectile and the tethered airborne target descend to the ground.

2. The system of claim 1, wherein the entanglement mechanism is configured to arrest and capture an unmanned air vehicle.

3. The system of claim 1, wherein the nose cap portion comprises a nose cone that is configured to transiently retain the entanglement mechanism.

4. The system of claim 1 wherein the entanglement mechanism is a net that is projected outwards from the projectile by the propulsion mechanism.

5. The system of claim 4, wherein the net has weights to help shape its expansion as the net is projected out of the projectile.

6. The system of claim 4, wherein the net is made of Kevlar.

7. The system of claim 1, wherein the drag mechanism is a parachute that is projected out of the projectile.

8. The system of claim 1, further comprising an avionics system to control a deployment of the entanglement mechanism.

9. The system of claim 8, wherein the avionics system is configured to control the propulsion mechanism.

10. The system of claim 8, wherein the avionics system is configured to control the drag mechanism.

11. The system of claim 1, wherein the propulsion mechanism is a pressurized fluid and wherein a propulsion force is generated by pressurized fluid expansion.

12. An apparatus, comprising:
an airframe;
an entanglement mechanism;
a propulsion; and
a drag mechanism, wherein the airframe includes a nose cap portion, a fuselage portion, and a tail portion, wherein the entanglement mechanism is housed within the nose cap portion and the steering mechanism is mounted to the tail portion,
wherein as the apparatus approaches an airborne target the apparatus is slowed down by the drag mechanism, wherein as the apparatus slows down the propulsion mechanism is configured to cause the entanglement mechanism to be projected towards the airborne target,
wherein the entanglement mechanism is configured to arrest and capture the airborne target to tether the airborne target to the apparatus, wherein the entanglement portion is configured to be coupled to the drag mechanism through the fuselage portion after the entanglement mechanism and the drag mechanism are deployed, wherein the deployed entanglement portion is configured to be deployed from the nose cap portion and the drag mechanism is configured to be deployed from the tail portion, and wherein the drag mechanism is configured to slow down a speed at which the apparatus and tethered airborne target descend to the ground.

13. The system of claim 1, wherein the steering mechanism is configured to steer the projectile during flight.

14. The system of claim 1, wherein the steering mechanism is configured to steer the drag mechanism post-deployment of the drag mechanism.

* * * * *